United States Patent
Chou et al.

(10) Patent No.: US 11,303,501 B2
(45) Date of Patent: Apr. 12, 2022

(54) METHOD TO DYNAMICALLY CHANGE CONNECTIVITY OF VIRTUAL NETWORK FUNCTION (VNF) AND PHYSICAL NETWORK FUNCTION (PNF) INSTANCES IN NEW RADIO (NR) NETWORKS

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 16/509,959

(22) Filed: Jul. 12, 2019

(65) Prior Publication Data
US 2020/0014582 A1   Jan. 9, 2020

Related U.S. Application Data

(60) Provisional application No. 62/697,852, filed on Jul. 13, 2018.

(51) Int. Cl.
*H04L 12/24* (2006.01)
*H04W 72/04* (2009.01)
(Continued)

(52) U.S. Cl.
CPC ........ *H04L 41/046* (2013.01); *H04L 41/0813* (2013.01); *H04W 28/0835* (2020.05);
(Continued)

(58) Field of Classification Search
CPC ............. H04W 24/02; H04W 72/0406; H04W 72/0433; H04W 28/0835; H04W 28/12;
(Continued)

(56) References Cited

U.S. PATENT DOCUMENTS 10,116,571 B1 * 10/2018 Bertz ...................... H04L 67/38
2020/0409743 A1 * 12/2020 Ni ....................... H04L 41/5041

FOREIGN PATENT DOCUMENTS

WO   WO-2018119826 A1 *  7/2018 ........... H04L 41/082

OTHER PUBLICATIONS

Ferrus, R., et al, "On the Automation of RAN Slicing Provisioning and Cell Planning in NG-RAN", Jun. 2018, IEEE, pp. 1-6. (Year: 2018).*

(Continued)

*Primary Examiner* — Gregory G Todd
(74) *Attorney, Agent, or Firm* — Kowert, Hood, Munyon, Rankin & Goetzel, P.C.

(57) ABSTRACT

Embodiments of a Network Manager (NM), a (NFVO), and methods of communication are disclosed herein. The NM may transfer, to the NFVO, an update NS request message to update the NS instance based on the new NSD. The NM may encode the update NS request message to include: an nsInstanceID parameter that identifies the NS instance, and an updateType parameter that indicates a type of update for the NS instance. One value of "AssocPnfWithPnfProfile" for the updateType parameter may indicate a request to associate the PNF of the NS instance with a new or updated PNF profile indicated by the new NSD. Another value of "AssocVnfWithVnfProfile" for the updateType parameter may indicate a request to associate the VNF of the NS instance with a new or updated VNF profile indicated by the new NSD.

20 Claims, 11 Drawing Sheets

(51) Int. Cl.
*H04W 28/08* (2009.01)
*H04W 28/16* (2009.01)
*H04W 28/18* (2009.01)
*H04W 28/12* (2009.01)
*H04W 24/02* (2009.01)
*H04L 41/046* (2022.01)
*H04L 41/0813* (2022.01)

(52) U.S. Cl.
CPC ........... *H04W 28/12* (2013.01); *H04W 28/16* (2013.01); *H04W 28/18* (2013.01); *H04W 72/0406* (2013.01); *H04W 72/0433* (2013.01); *H04W 24/02* (2013.01)

(58) Field of Classification Search
CPC .... H04W 28/16; H04W 28/18; H04L 41/046; H04L 41/0813
See application file for complete search history.

(56) References Cited

OTHER PUBLICATIONS

Network Functions Virtualisation (NFV) ETSI Industry Specification Group (ISG), ETSI GS NFV-IFA 013, Feb. 2018, V2.4.1, pp. 1-151. (Year: 2018).*
Network Functions Virtualisation (NFV) ETSI Industry Specification Group (ISG), ETSI GS NFV-IFA 013, Aug. 2018, V3.1.1, pp. 1-182. (Year: 2018).*
Network Functions Virtualisation (NFV) ETSI Industry Specification Group (ISG), ETSI GS NFV-IFA 013, Apr. 2019, V3.2.1, pp. 1-192. (Year: 2019).*

* cited by examiner

METHOD TO DYNAMICALLY CHANGE CONNECTIVITY OF VIRTUAL NETWORK FUNCTION (VNF) AND PHYSICAL NETWORK FUNCTION (PNF) INSTANCES IN NEW RADIO (NR) NETWORKS

PRIORITY CLAIM

This application claims priority under 35 USC 119(e) to U.S. Provisional Patent Application Ser. No. 62/697,852, filed Jul. 13, 2018 [reference number AB3364-Z, 1884.840PRV], which is incorporated herein by reference in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, New Radio (NR) networks, and 3GPP LTE-A (LTE Advanced) networks, although the scope of the embodiments is not limited in this respect. Some embodiments relate to paging of mobile devices. Some embodiments relate to disaggregated base stations, including disaggregated Next Generation Node-B (gNB) devices. Some embodiments relate to virtual network functions (VNFs) and physical network functions (PNFs). Some embodiments relate to methods to dynamically change the connectivity among VNF and PNF instances, including but not limited to methods to dynamically change the connectivity among VNF and PNF instances in NR networks.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
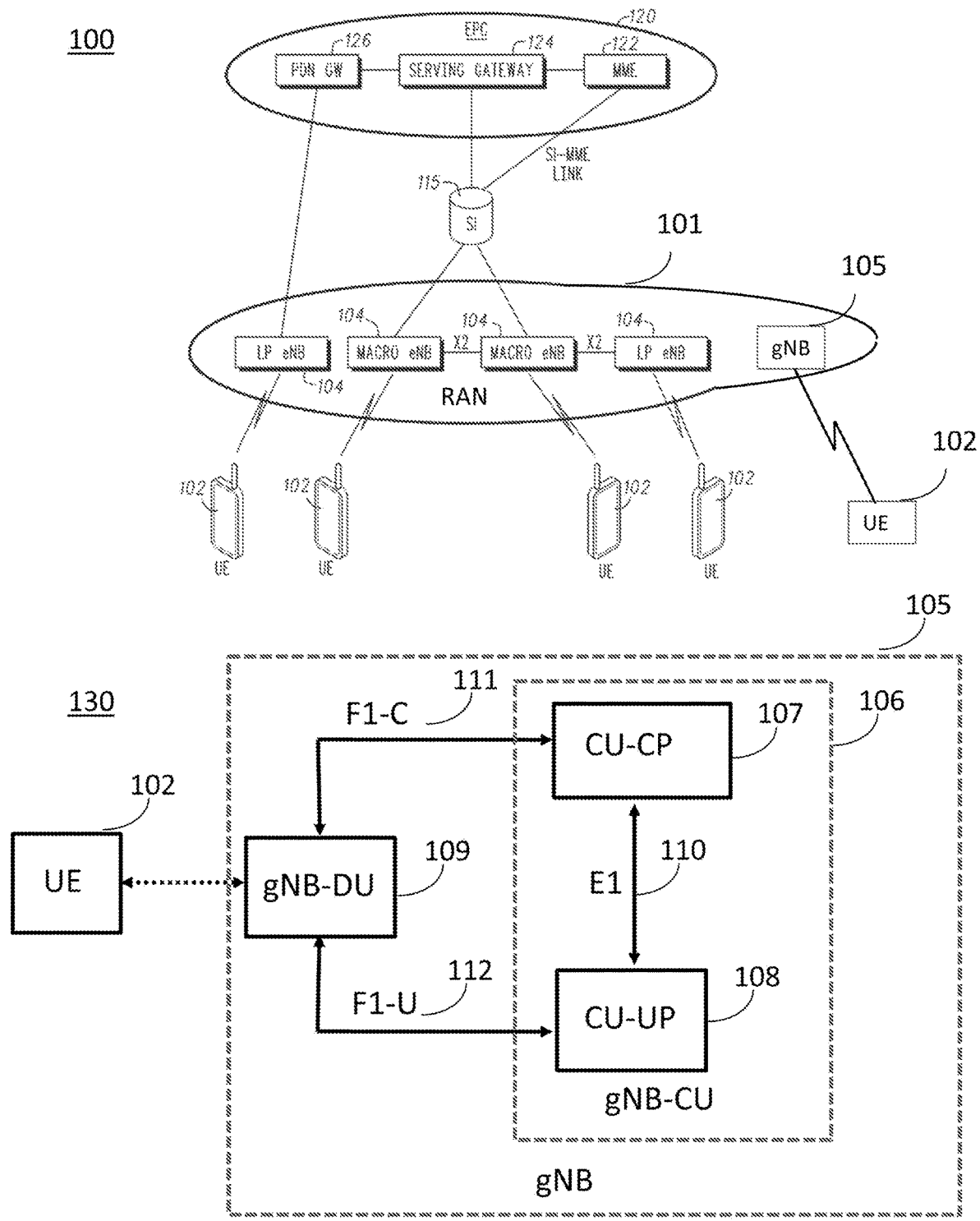
FIG. 1A is a functional diagram of an example network in accordance with some embodiments.
Figure 1B:
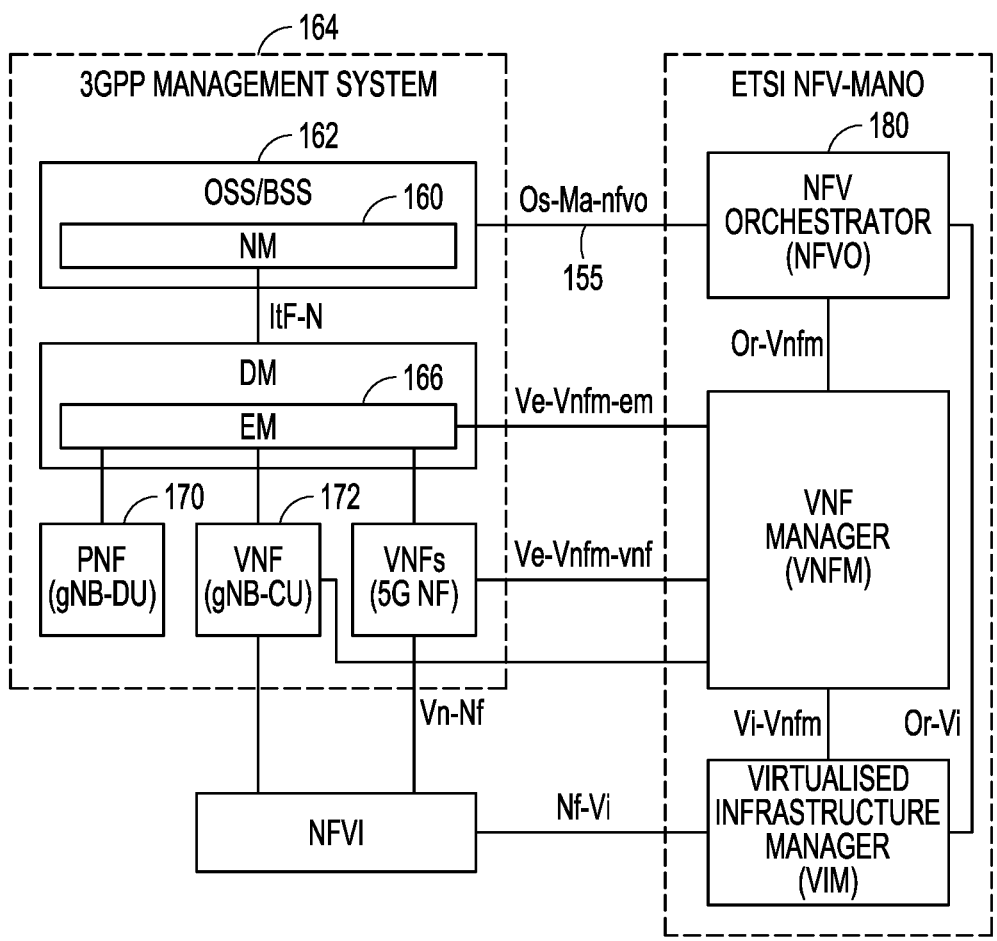
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 130 may be a 3GPP network. In a non-limiting example, the network 130 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120. In the network 100 shown in FIG. 1, a core network for 4G (a 4GC) is illustrated, but the scope of embodiments is not limited to usage of this network. In some embodiments, the core network may be a 5GC network, and one or more components may communicate through an NG interface, although the scope of embodiments is not limited in this respect. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of a 5G network. In another non-limiting example, the RAN 101 may include one or more components of an E-UTRAN and one or more components of another network (including but not limited to an NR network).

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise a gNB central unit (gNB-CU) 106 and a gNB distributed unit (gNB-DU) 109. Embodiments are not limited to the number of components shown, as the gNB 105 may include multiple gNB-CUs 106 and/or multiple gNB-DUs 109, in some embodiments. In some embodiments, the gNB-CU 106 may include a control unit user-plane (CU-UP) entity 108 and a control unit control-plane (CU-CP) 107. Embodiments are not limited to the number of components shown, as the gNB-CU 106 may include multiple CU-CPs 107 and/or multiple CU-UPs 108, in some embodiments. In some embodiments, the CU-CP 107 and the CU-UP 108 may communicate over the E1 interface 110, although the scope of embodiments is not limited in this respect. In some embodiments, the gNB-CU 106 and the gNB-DU 109 may communicate over an F1 interface, although the scope of embodiments is not limited in this respect. In some embodiments, the F1 interface may include an F1-C interface 111 and an F1-U interface 112, although the scope of embodiments is not limited in this respect. In some embodiments, the CU-CP 107 and the gNB-DU 109 may communicate over the F1-C interface 111, although the scope of embodiments is not limited in this respect. In some embodiments, the CU-UP 108 and the gNB-DU 109 may communicate over the F1-U interface 112, although the scope of embodiments is not limited in this respect.

In some embodiments, the gNB-CU 106 and the gNB-DU 109 may be part of a disaggregated gNB 105. One or more of the gNB-CU 106, CU-CP 107, CU-UP 108, gNB-DU 109 may be co-located, in some embodiments. One or more of the gNB-CU 106, CU-CP 107, CU-UP 108, gNB-DU 109 may not necessarily be co-located, in some embodiments. Other arrangements are possible, including arrangements in which two or more of the gNB-CU 106, CU-CP 107, CU-UP 108, gNB-DU 109 are co-located.

The scope of embodiments is not limited to arrangements in which the gNB-CU 106 and the gNB-DU 109 are part of a disaggregated gNB 105, however. In some embodiments, one or more of the techniques, operations and/or methods described herein may be practiced by a gNB-CU 106, CU-CP 107, CU-UP 108 and/or gNB-DU 109 that may not necessarily be included in a disaggregated gNB 105.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one of the gNB-CU 106, CU-CP 107, CU-UP 108, gNB-DU 109.

References herein to an operation, technique and/or method performed by the gNB 105 are not limiting. In some embodiments, such an operation, technique and/or method may be performed by one of the gNB-CU 106, CU-CP 107, CU-UP 108, gNB-DU 109.

In some embodiments, one or more of the UEs 102, gNBs 105, gNB-CU 106, CU-CP 107, CU-UP 108, gNB-DU 109, and/or eNBs 104 may be configured to operate in accordance with an NR protocol and/or NR techniques. References to a UE 102, eNB 104, gNB 105, gNB-CU 106, CU-CP 107, CU-UP 108 and/or gNB-DU 109 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the gNB-DU 109). In some embodiments, the UE 102 may receive signals from a component of a disaggregated gNB 105 (such as the gNB-DU 109).

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104, a gNB 105, a gNB-CU 106, a gNB-DU 109, a relay 114 and/or other component(s) over a multicarrier communication channel in accordance with an Orthogonal Frequency Division Multiple Access (OFDMA) communication technique. In some embodiments, an eNB 104, a gNB 105, a gNB-CU 106, a gNB-DU 109, a relay 114 and/or other component(s) may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U.

The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

FIG. 1B depicts a non-limiting example 150 of a 3GPP management and ETSI NFV MANO (Management and Orchestration) architecture that is to support the management of 4G networks. Embodiments are not limited to the number or type of components shown in FIG. 1B. Embodiments are also not limited to the connectivity of components shown in FIG. 1B.

The Network Manager (NM) 160 may communicate with the Network Function Virtualization Orchestrator (NFVO) 180 to initiate the lifecycle management procedures to deploy the VNFs in the cloud. In some embodiments, 5G management may be based on Service Based Architecture (SBA) where each management function is a producer that produce management services to be consumed by other management functions. In some embodiments, the network 150 may include one or more components configured to operate in accordance with one or more 3GPP standards, including but not limited to an NR standard.

In some embodiments, the network 150 shown in FIG. 1B may include one or more NMs 160. In some embodiments, an NM 160 may be part of an OSS/BSS 162, although the scope of embodiments is not limited in this respect. In some embodiments, the OSS/BSS 162 may be part of a 3GPP management system 164, although the scope of embodiments is not limited in this respect.

In some embodiments, the NM 160 may communicate with an element manager (EM) 166, although the scope of embodiments is not limited in this respect. In some embodiments, the EM 166 may communicate with a PNF 170 and/or a VNF 172, although the scope of embodiments is not limited in this respect.

It should be noted that the PNF 170 may be related to a gNB-DU 109, although the scope of embodiments is not limited in this respect. It should be noted that the VNF 172 may be related to a gNB-CU 106, although the scope of embodiments is not limited in this respect.

In some embodiments, the NM 160 and the NFVO 180 may communicate with each other. In some embodiments, the NM 160 and the NFVO 180 may communicate over the Os-Ma-nfvo interface 155, although the scope of embodiments is not limited in this respect.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. In some embodiments, a downlink resource grid may be used for downlink transmissions from a relay 114 to a UE 102, while uplink transmission from the UE 102 to the relay 114 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
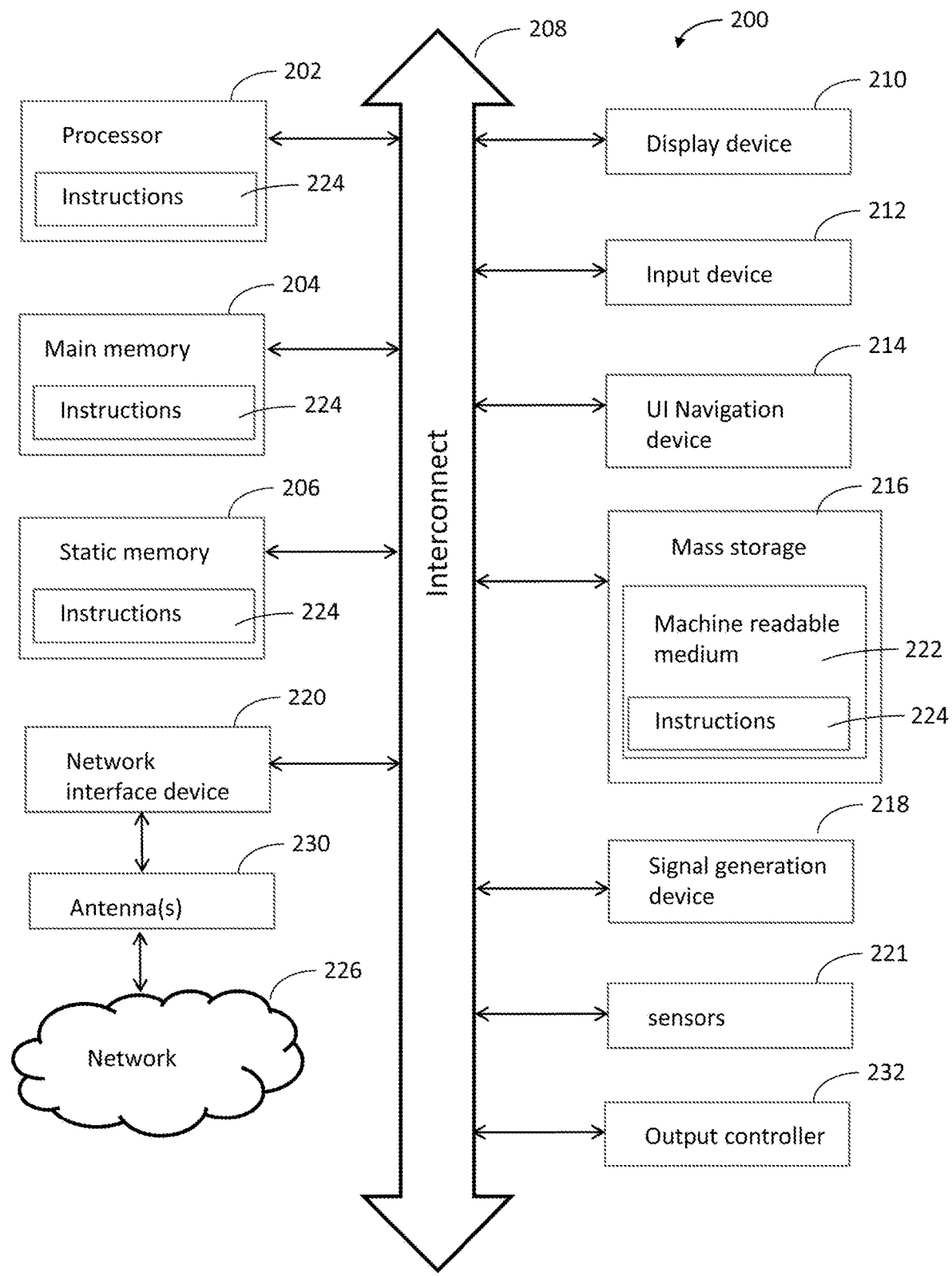
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, gNB-CU 106, CU-CP 107, CU-UP 108, gNB-DU 109, NM 160, NFVO 180, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
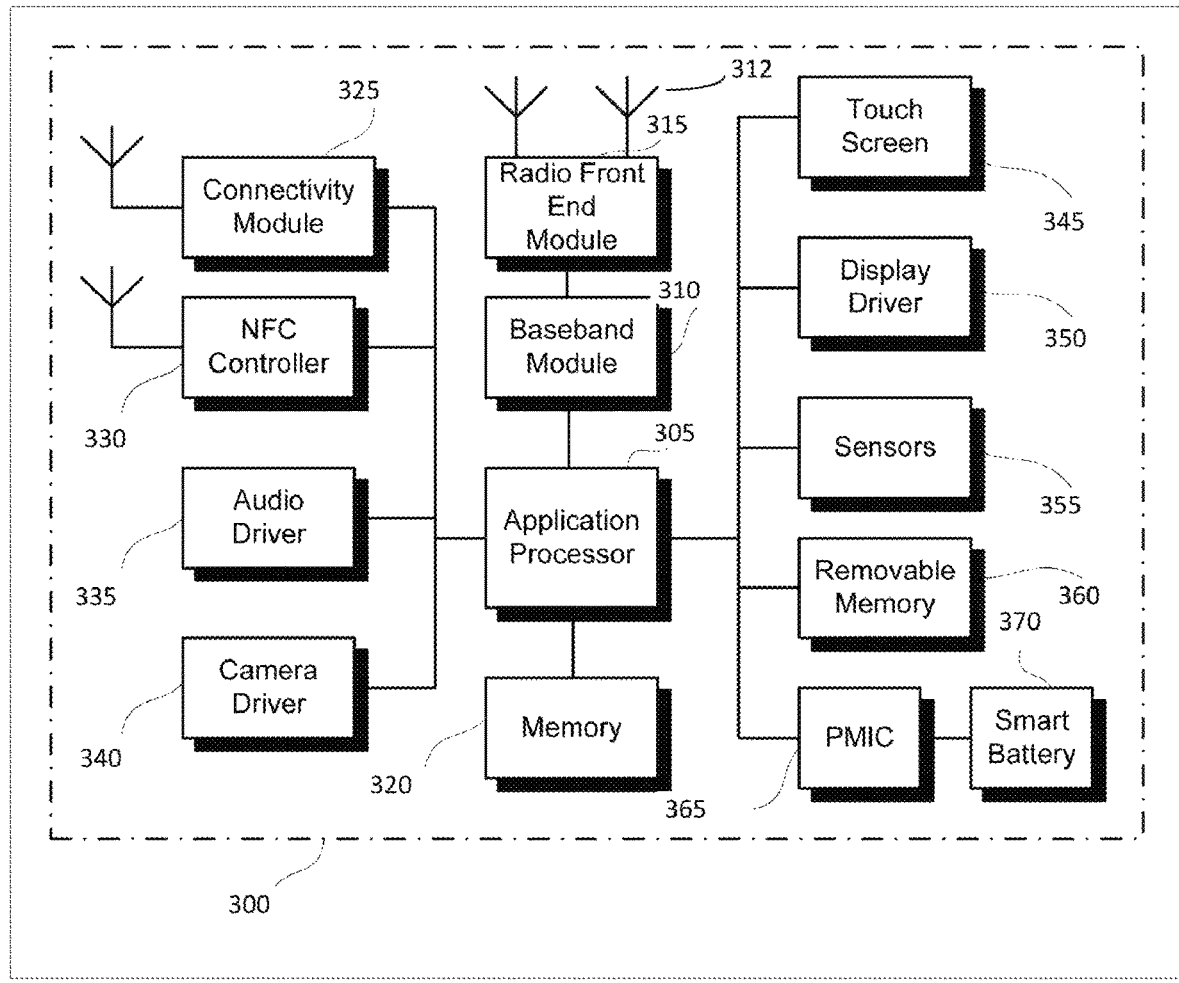
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
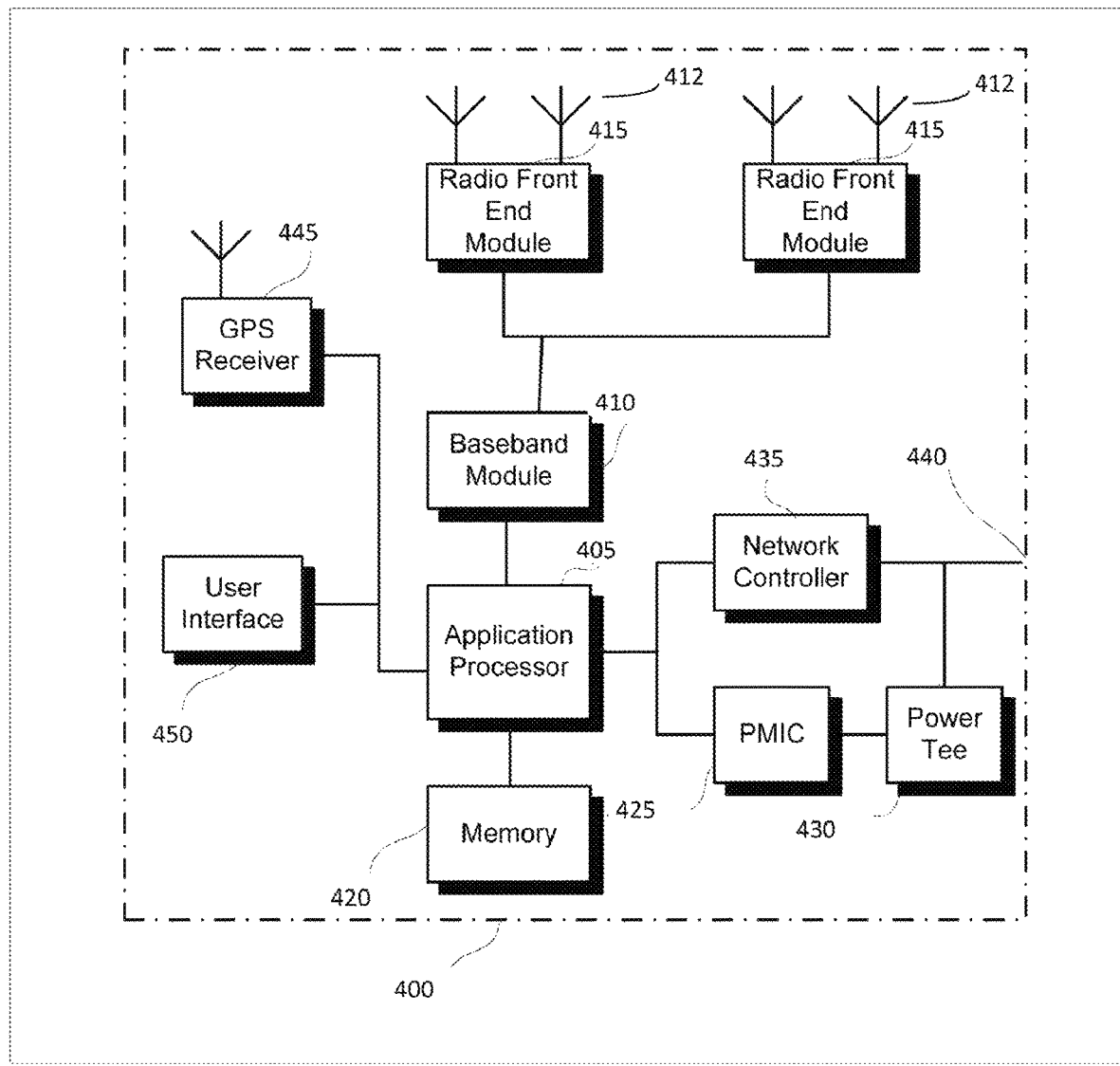
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a gNB-CU 106, an apparatus of a gNB-CU 106, a CU-CP 107, an apparatus of a CU-CP 107, a CU-CU 108, an apparatus of a CU-CU 108, a gNB-DU 109 an apparatus of a gNB-DU 109, an apparatus of an NM 160, an apparatus of an NFVO 180, a base station and/or an apparatus of a base station may include one or more of the components shown in one or more of FIGS. 2, 4, and 5. In some embodiments, such an eNB 104, gNB 105, gNB-CU 106, CU-CP 107, CU-UP 108, gNB-DU 109, NM 160, NFVO 180, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
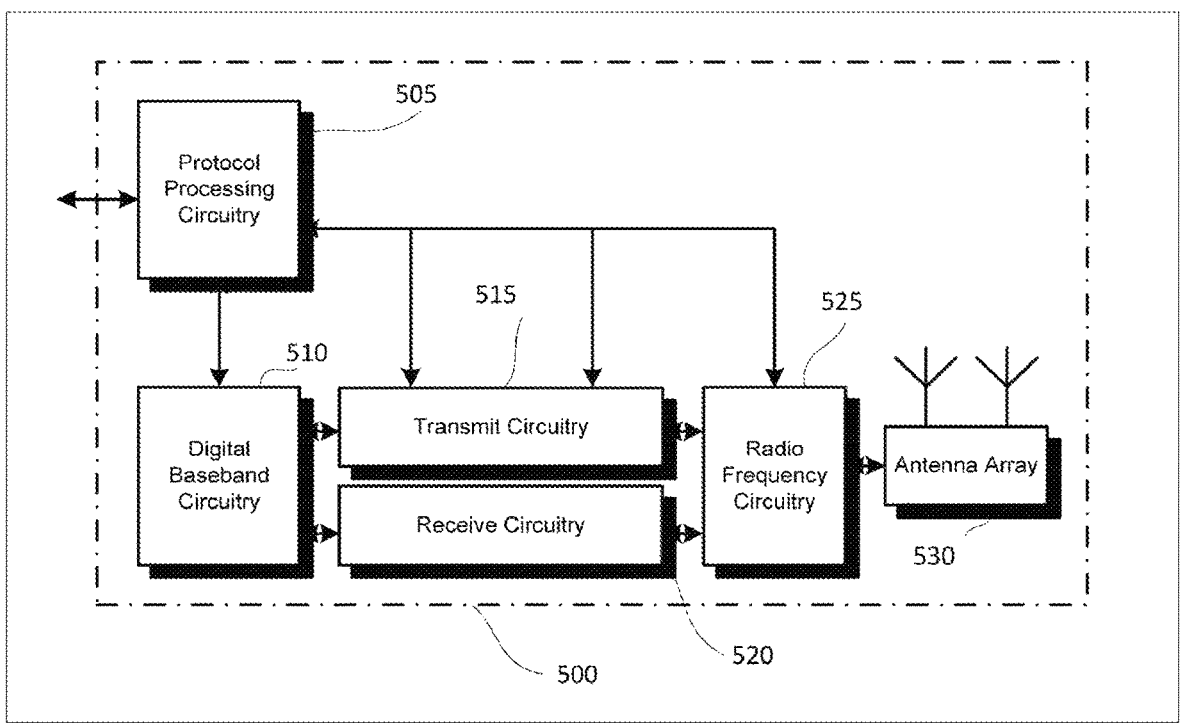
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, gNB-CU 106, CU-CP 107, CU-UP 108, gNB-DU 109, NM 160, NFVO 180, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, gNB-CU 106, CU-CP 107, CU-UP 108, gNB-DU 109, NM 160, NFVO 180, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, gNB-CU 106, CU-CP 107, CU-UP 108, gNB-DU 109, NM 160, NFVO 180, user device 300, base station 400, machine 200 and/or other device described herein may be configured to operate in accordance with 3GPP standards, although the scope of the embodiments is not limited in this respect. In some embodiments, the UE 102, eNB 104, gNB 105, gNB-CU 106, CU-CP 107, CU-UP 108, gNB-DU 109, NM 160, NFVO 180, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, gNB-CU 106, CU-CP 107, CU-UP 108, gNB-DU 109, NM 160, NFVO 180, user device 300, base station 400, machine 200 and/or other device described herein may be configured to operate according to other protocols or standards, including IEEE 802.11 or other IEEE standards. In some embodiments, the UE 102, eNB 104, gNB 105, gNB-CU 106, CU-CP 107, CU-UP 108, gNB-DU 109, NM 160, NFVO 180, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, gNB-CU 106, CU-CP 107, CU-UP 108, gNB-DU 109, NM 160, NFVO 180, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, gNB-CU 106, CU-CP 107, CU-UP 108, gNB-DU 109, NM 160, NFVO 180, machine 200, user device 300 and/or base station 400 may include various components shown in FIGS. 2-5. Accordingly, techniques and operations described herein that refer to the NM 160 may be applicable to an apparatus of an NM. In addition, techniques and operations described herein that refer to the NFVO 180 may be applicable to an apparatus of an NFVO.

It should be noted that some of the descriptions herein may refer to performance of operations, methods and/or techniques by elements such as the gNB 105, gNB-CU 106, CU-CP 107, CU-UP 108, gNB-DU 109 and/or NM 160, NFVO 180. Such references are not limiting, however. One or more of the operations, methods and/or techniques may be performed by one or more other entities, in some embodiments.

In accordance with some embodiments, an NM 160 of a NR network may exchange signaling with a NFVO 180 of the NR network to establish an instance of a network service (NS). The NS instance may be based on a network service descriptor (NSD) that includes a virtual network function (VNF) profile and a physical network function (PNF) profile. The NM 160 may transfer, to the NFVO 180, an upload network service descriptor (NSD) request message that indicates a new NSD to be uploaded by the NFVO 180 for an update of the NS instance. The NM 160 may transfer, to the NFVO 180, an update NS request message to update the NS instance based on the new NSD. The NM 160 may encode the update NS request message to include: an nsInstanceID parameter that identifies the NS instance, and an updateType parameter that indicates a type of update for the NS instance. One value of "AssocPnfWithPnfProfile" for the update Type parameter may indicate a request to associate the PNF of the NS instance with a new or updated PNF profile indicated by the new NSD. Another value of "AssocVnfWithVnfProfile" for the update Type parameter may indicate a request to associate the VNF of the NS instance with a new or updated VNF profile indicated by the new NSD. These embodiments are described in more detail below.

Figure 6:
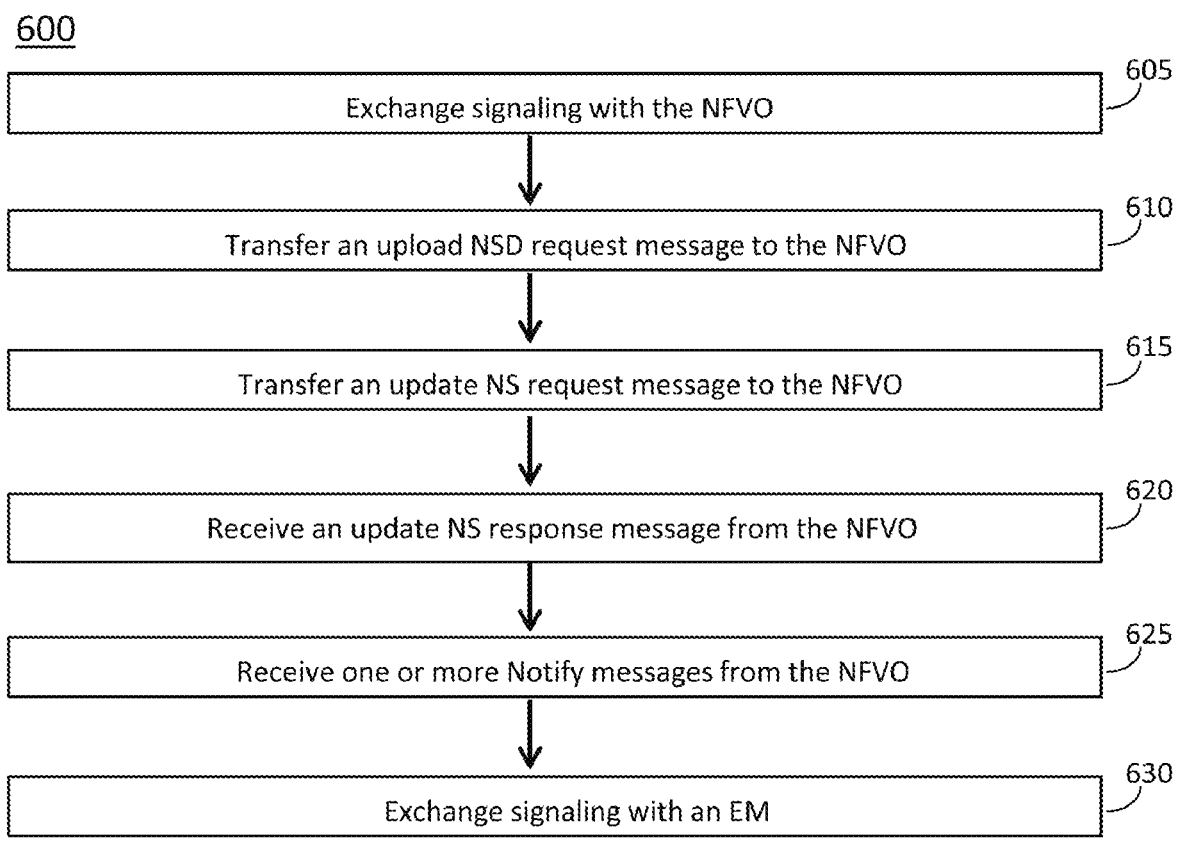
FIG. 6 illustrates the operation of a method of communication in accordance with some embodiments.
Figure 7:
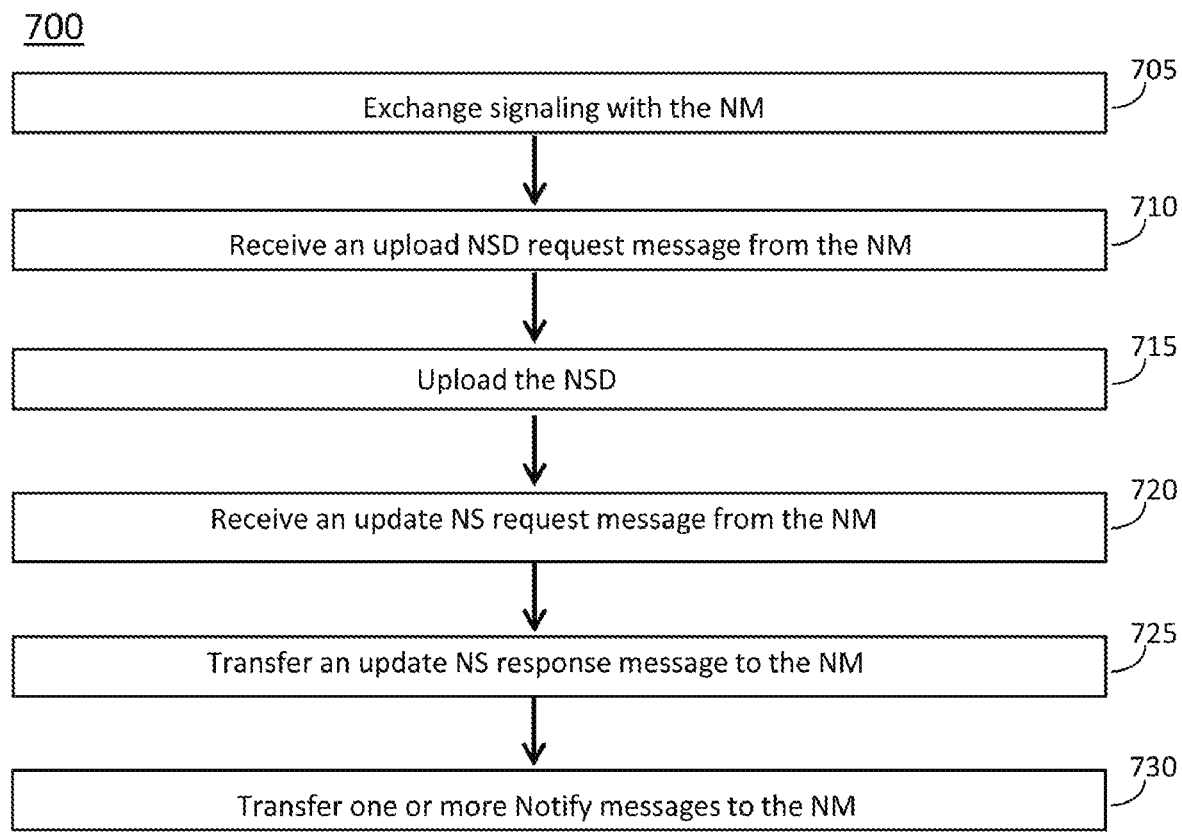
FIG. 7 illustrates the operation of another method of communication in accordance with some embodiments.

FIG. 6 illustrates the operation of a method of communication in accordance with some embodiments. FIG. 7 illustrates the operation of another method of communication in accordance with some embodiments. It is important to note that embodiments of the methods 600, 700 may include additional or even fewer operations or processes in comparison to what is illustrated in FIGS. 6-7. In addition, embodiments of the methods 600, 700 are not necessarily limited to the chronological order that is shown in FIGS. 6-7. In describing the methods 600 and/or 700, references may be made to one or more figures, although it is understood that the methods 600, 700 may be practiced with any other suitable systems, interfaces and components.

The methods 600, 700 and other methods described herein may refer to NMs 160, NFVOs 180, other devices and/or other components operating in accordance with 3GPP standards, 5G standards, NR standards and/or other standards. However, embodiments are not limited to performance of those methods by those devices/components, and may also be performed by other devices/components. In addition, the method 600 and other methods described herein may be practiced by wireless devices configured to operate in other suitable types of wireless communication systems, including systems configured to operate according to various IEEE standards such as IEEE 802.11.

The methods 600 and/or 700 may also be applicable to an apparatus of an NM 160, an apparatus of an NFVO 180, and/or an apparatus of another device described above.

It should also be noted that embodiments are not limited by references herein (such as in descriptions of the methods 600, 700 and/or other descriptions herein) to transfer, transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transfer and/or transmission. The transfer and/or transmission may be performed by an interface, a transceiver and/or other component, in some cases. In some embodiments, such an element may be decoded, detected or otherwise processed by the processing circuitry (such as by the baseband processor). The element may be received by an interface, transceiver and/or other component, in some cases. In some embodiments, the processing circuitry and the interface may be included in a same apparatus. The scope of embodiments is not limited in this respect, however, as the interface may be separate from the apparatus that comprises the processing circuitry, in some embodiments. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of those elements, and is also not limited to usage of elements that are included in standards, however. For instance, although an operation may include usage of a message in descriptions herein, it is understood that the same operation and/or similar operation may use a different message, in some embodiments.

In some embodiments, an NM 160 may perform one or more operations of the method 600, but embodiments are not limited to performance of the method 600 and/or operations of it by the NM 160. In some embodiments, another component may perform one or more operations of the method 600. In some embodiments, the NFVO 180, NM 160 and/or other component may perform one or more operations that may be similar to one or more operations of the method 600. In some embodiments, the NFVO 180, NM 160 and/or other component may perform one or more operations that may be reciprocal to one or more operations of the method 600.

In some embodiments, an apparatus (including but not limited to an apparatus of an NR network) may comprise memory and processing circuitry. The processing circuitry may be configured to operate as an NM 160, and the processing circuitry (when configured to operate as an NM 160) may perform one or more operations of the method 600 and/or other operations. Accordingly, references to performance of an operation by the NM 160 are not limiting. The same operation and/or similar operation may be performed by the processing circuitry when the processing circuitry is configured to operate as an NM 160, in some embodiments.

In some embodiments, an NFVO 180 may perform one or more operations of the method 700, but embodiments are not limited to performance of the method 700 and/or operations of it by the NFVO 180. In some embodiments, another component may perform one or more operations of the method 700. In some embodiments, the NFVO 180, NM 160 and/or other component may perform one or more operations that may be similar to one or more operations of the method 700. In some embodiments, the NFVO 180, NM 160 and/or other component may perform one or more operations that may be reciprocal to one or more operations of the method 700.

In an example, in the method 700, the NFVO 180 may perform one or more operations that may be reciprocal to one or more operations of the method 600 and/or reciprocal to one or more operations described herein. For instance, an operation of the method 600 may include transmission/transfer of a message by the NM 160 and an operation of the method 700 may include reception of the same message and/or similar message by the NFVO 180.

In some embodiments, an apparatus (including but not limited to an apparatus of an NR network) may comprise memory and processing circuitry. The processing circuitry may be configured to operate as an NFVO 180, and the processing circuitry (when configured to operate as an NFVO 180) may perform one or more operations of the method 700 and/or other operations. Accordingly, references to performance of an operation by the NFVO 180 are not limiting. The same operation and/or similar operation may be performed by the processing circuitry when the processing circuitry is configured to operate as an NFVO 180, in some embodiments.

In some embodiments, the NM 160 and/or NFVO 180 may be arranged to operate in accordance with one or more of: a new radio (NR) protocol, a 3GPP protocol, a 3GPP LTE protocol and/or other protocol(s).

At operation 605, the NM 160 may exchange signaling with the NFVO 180. At operation 610, the NM 160 may transfer an upload NSD request message to the NFVO 180. At operation 615, the NM 160 may transfer an update NS request message to the NFVO 180. At operation 620, the NM 160 may receive an update NS response message from the NFVO 180. At operation 625, the NM 160 may receive one or more Notify messages from the NFVO 180. At operation 630, the NM 160 may exchange signaling with an Element Manager (EM) 166.

In some embodiments, the NM 160 may exchange signaling with the NFVO 180 of the NR network to establish an instance of a network service (NS), wherein the NS instance is based on a network service descriptor (NSD) that includes a virtual network function (VNF) profile and a physical network function (PNF) profile. In some embodiments, the NM 160 may transfer, to the NFVO 180, an upload network service descriptor (NSD) request message that indicates a new NSD to be uploaded by the NFVO for an update of the NS instance. In some embodiments, the NM 160 may transfer, to the NFVO 180, an update NS request message to update the NS instance based on the new NSD. In some embodiments, the NM 160 may encode the update NS request message to include one or more of: an nsInstanceID parameter that identifies the NS instance, an updateType parameter that indicates a type of update for the NS instance, and/or other. In some embodiments, one value of "AssocPnfWithPnfProfile" for the updateType parameter may indicate a request to associate the PNF of the NS instance with a new or updated PNF profile indicated by the new NSD; and another value of "AssocVnfWithVnfProfile" for the update Type parameter may indicate a request to associate the VNF of the NS instance with a new or updated VNF profile indicated by the new NSD.

In some embodiments, the NM 160 may, if the updateType parameter is encoded to the value of "AssocPnfWithPnfProfile," encode the update NS request message to include a PnfProfileData information element (IE) that includes one or more of: a pnfId parameter that identifies the PNF of the NS instance to be updated; pnfProfileId parameter that identifies the new or updated PNF profile to which the PNF of the NS instance is to be associated; and/or other.

In some embodiments, the NM 160 may, if the updateType parameter is encoded to the value of "AssocVnfWithVnfProfile," encode the update NS request message to include a VnfProfileData IE that includes one or more of: a vnfInstanceId parameter that identifies the VNF of the NS instance to be updated; a vnfProfileId parameter that identifies the new or updated VNF profile to which the VNF of the NS instance is to be associated; and/or other.

In some embodiments, the new or updated PNF profile may be configurable to indicate new or changed NS virtual link connectivity for the PNF of the NS instance. In some embodiments, the new or updated VNF profile may be configurable to indicate new or changed NS virtual link connectivity for the VNF of the NS instance. If the updated PNF profile and VNF profile contain the same NS virtual link, then the associated PNF and VNF instance in the NS instance are connected.

In some embodiments, the NM 160 may receive, from the NFVO 180 in response to the update NS request message, an update NS response message that includes a lifecycleOperationOccurrenceId parameter that indicates an occurrence of an NS lifecycle operation.

In some embodiments, the NM 160 may receive, from the NFVO 180 in response to the update NS request message, a first Notify message and/or a second Notify message. In some embodiments, the first Notify message may include an NsLifecycleChangeNotification IE that includes one or more of: the nsInstanceID parameter; the lifecycleOperationOccurrenceId parameter; an operation parameter set to a value of "NsUpdate"; a notification Type parameter set to a value of "start" to indicate a start of the NS update; and/or other. In some embodiments, the second Notify message may include an NsLifecycleChangeNotification IE that includes one or more of: the nsInstanceID parameter; the lifecycleOperationOccurrenceId parameter; the operation parameter set to a value of "NsUpdate"; the notification Type parameter set to a value of "result" to indicate an end result of the NS update; and/or other.

In some embodiments, the NM 160 may determine, based on signaling from the NFVO 180, that the new NSD has been uploaded by the NFVO 180 and/or that the new NSD has been associated with the NS instance. In some embodiments, the NM 160 may restrict transfer of the update NS request message until after it has been determined that the new NSD has been uploaded by the NFVO 180 and/or that the new NSD has been associated with the NS instance.

In some embodiments, the NM 160 may perform management functions for the NR network, including functions related to VNFs.

In some embodiments, the NM 160 may be part of an Operations Support System/Business Support System (OSS/BSS) of the NR network.

In some embodiments, the NM 160 may exchange signaling with an EM 166 of the NR network to configure the gNB 105 comprising a gNB-CU 106 and a gNB-DU 109. In some embodiments, the signaling may configure the VNF for the gNB-CU 106. In some embodiments, the signaling may configure the PNF for the gNB-DU 109.

In some embodiments, the NM 160 may be configured to communicate with the NFVO 180 to initiate lifecycle management procedures for cloud-based implementations of VNFs. In some embodiments, the NM 160 may be configured to communicate with the NFVO 180 to enable dynamic adaptation of NSDs, VNFs and/or PNFs.

In some embodiments, the NM 160 may transfer, to the NFVO 180, an upload NSD request message, wherein an instance of an NS established in the NR network is based on an NSD that includes a VNF profile and a PNF profile. The upload NSD request message may indicate a new NSD to be uploaded by the NFVO 180. The NM 160 may transfer, to the NFVO 180, an update NS request message that includes one or more of: an nsInstanceID parameter that identifies the NS instance; an update Type parameter configurable to indicate an update of the PNF of the NS or an update of the VNF of the NS; and/or other. In some embodiments, the NM 160 may: encode the updateType parameter to a value of "AssocPnfWithPnfProfile" to indicate a request to associate the PNF of the NS instance with a new or updated PNF profile indicated by the new NSD; and encode the updateType parameter to a value of "AssocVnfWithVnfProfile" to indicate a request to associate the VNF of the NS instance with a new or updated VNF profile indicated by the new NSD. In some embodiments, the NM 160 may be configured to perform management functions for the NR network, including functions related to VNFs. In some embodiments, the NM 160 may be part of an OSS/BSS of the NR network.

In some embodiments, an apparatus of an NM 160 may comprise memory. The memory may be configurable to store at least a portion of an update NS request message. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to encoding of the update NS request message. The apparatus may include an interface and/or transceiver to transfer the update NS request message. The interface and/or transceiver may transfer, transmit and/or receive other blocks, messages and/or other elements. In some embodiments, the NM may transfer the update NS request message to the NFVO 180 on an Os-MA-nfvo interface.

At operation 705, the NFVO 180 may exchange signaling with the NM 160. At operation 710, the NFVO 180 may receive an upload NSD request message from the NM 160. At operation 715, the NFVO 180 may upload the NSD. At operation 720, the NFVO 180 may receive an update NS request message from the NM 160. At operation 725, the NFVO 180 may transfer an update NS response message to the NM 160. At operation 730, the NFVO 180 may transfer one or more Notify messages to the NM 160.

In some embodiments, an NFVO 180 of an NR network may exchange signaling with an NM 160 of the NR network to establish an instance of an NS. The NS instance may be based on an NSD that includes a VNF profile and a PNF profile. The NFVO 180 may receive, from the NM 160, an upload NSD request message that indicates a new NSD to be uploaded by the NFVO 180 for an update of the NS instance. The NFVO 180 may upload the new NSD. The NFVO 180 may transfer, to the NM, signaling to indicate that the new NSD has been uploaded. The NFVO 180 may receive, from the NM 160, an update NS request message for an update of the NS instance based on the new NSD. The update NS request message may include an updateType parameter configurable to indicate one or more of: a request to associate the PNF of the NS instance with a new or updated PNF profile indicated by the new NSD; a request to associate the VNF of the NS instance with a new or updated VNF profile indicated by the new NSD; and/or other.

In some embodiments, the NFVO 180 may transfer, to the NM 160 in response to the update NS request message, an update NS response message that includes a lifecycleOperationOccurrenceId parameter that indicates an occurrence of an NS lifecycle operation.

In some embodiments, the NFVO 180 may transfer, to the NM in response to the update NS request message, a first Notify message and/or a second Notify message. The first Notify message may include an NsLifecycleChangeNotification IE that includes one or more of: the nsInstanceID parameter; the lifecycleOperationOccurrenceId parameter; an operation parameter set to a value of "NsUpdate"; a notification Type parameter set to a value of "start" to indicate a start of the NS update; and/or other. The second Notify message may include an NsLifecycleChangeNotification IE that includes one or more of: the nsInstanceID parameter; the lifecycleOperationOccurrenceId parameter; the operation parameter set to a value of "NsUpdate"; the notification Type parameter set to a value of "result" to indicate an end result of the NS update; and/or other.

In some embodiments, an apparatus of an NFVO 180 may comprise memory. The memory may be configurable to store at least a portion of the update NS request message. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to decoding of the update NS request message. The apparatus may include an interface and/or transceiver to receive the update NS request message. The interface and/or transceiver may transfer, transmit and/or receive other blocks, messages and/or other elements.

Figure 8:
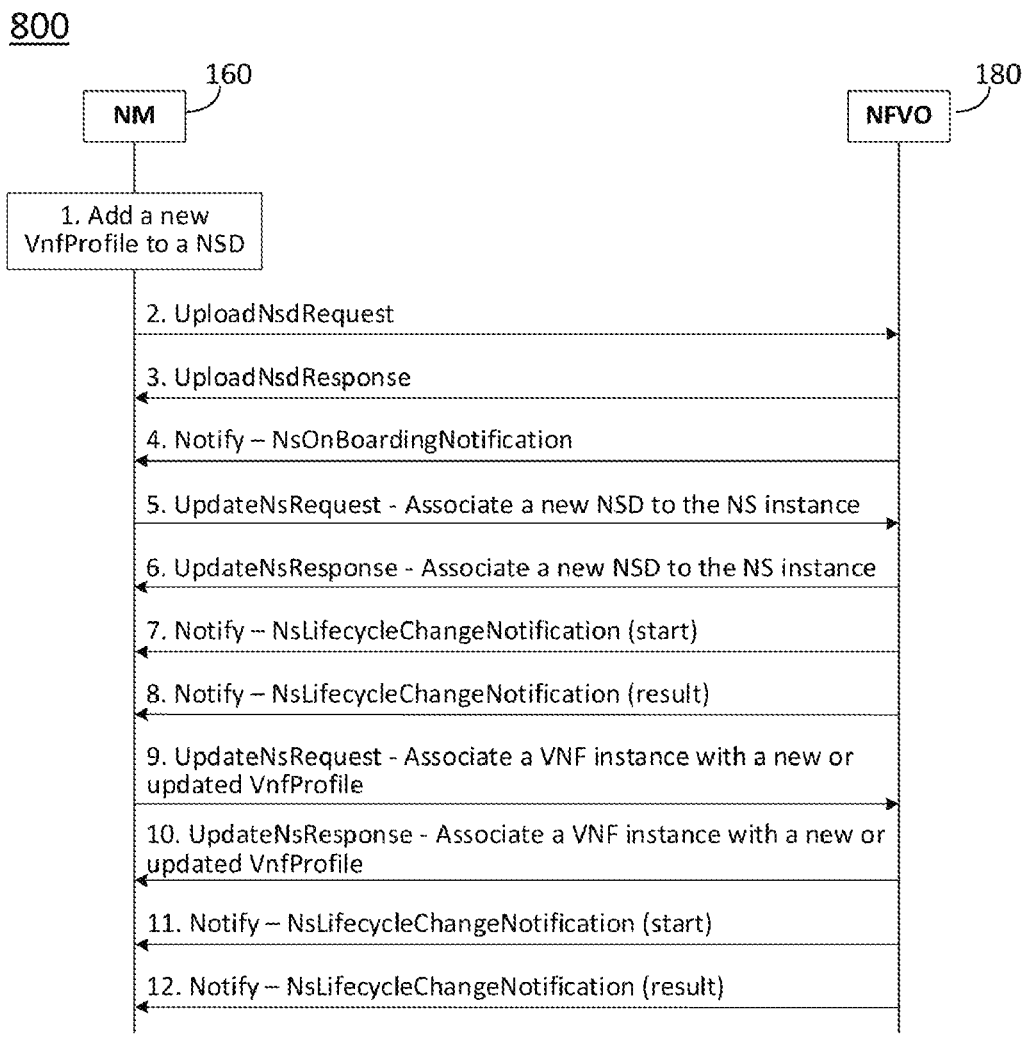
FIG. 8 illustrates a non-limiting example procedure to change VNF connectivity in accordance with some embodiments.
Figure 9:
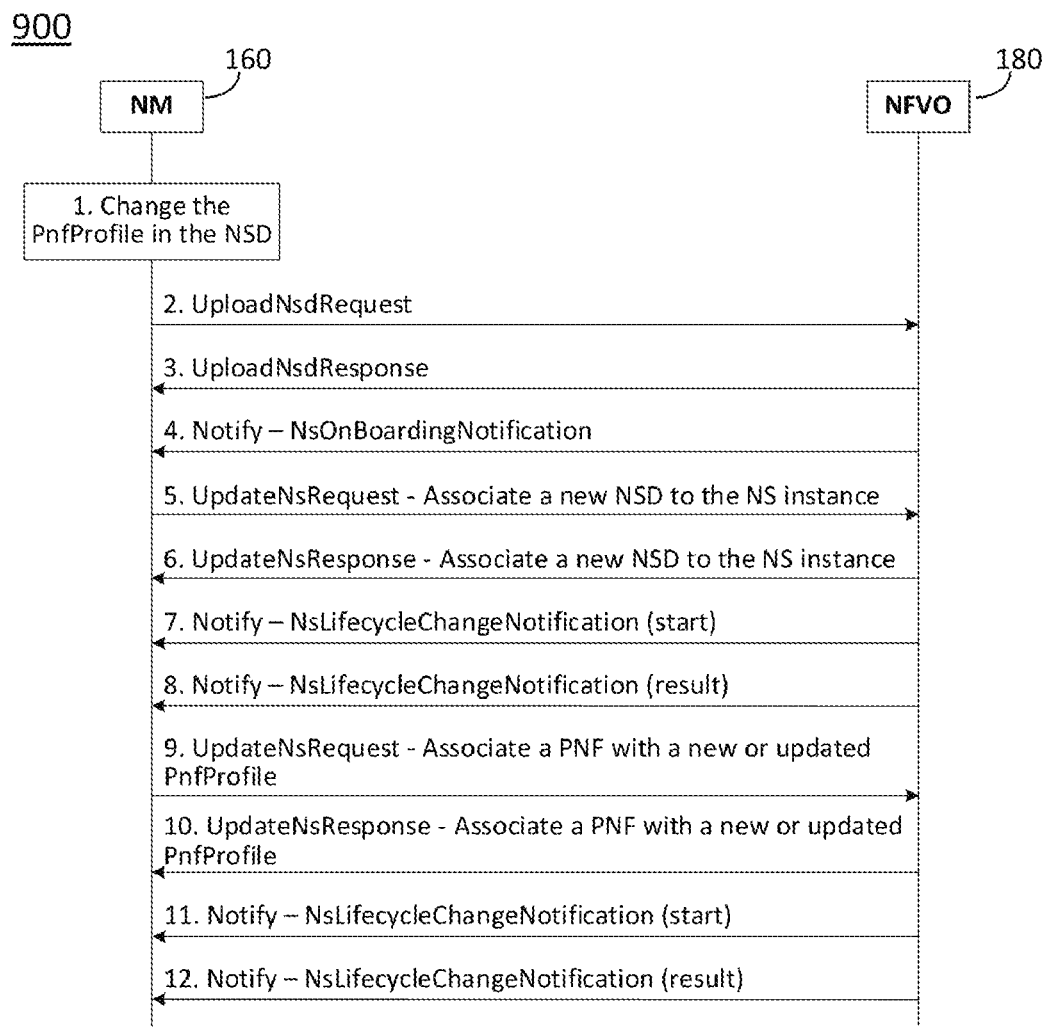
FIG. 9 illustrates a non-limiting example procedure to change PNF connectivity in accordance with some embodiments.
Figure 10:
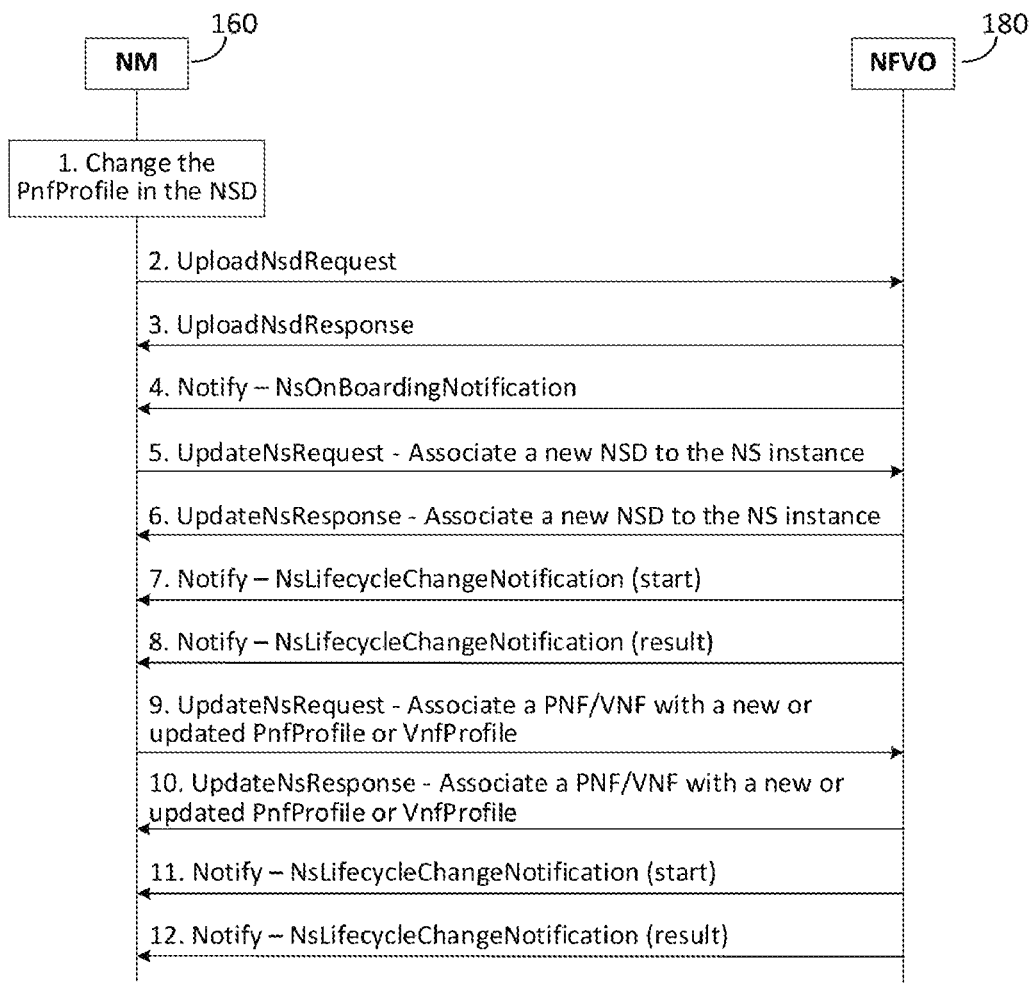
FIG. 10 illustrates a non-limiting example procedure to change VNF connectivity or PNF connectivity in accordance with some embodiments.

FIG. 8 illustrates a non-limiting example procedure to change VNF connectivity in accordance with some embodiments. FIG. 9 illustrates a non-limiting example procedure to change PNF connectivity in accordance with some embodiments. FIG. 10 illustrates a non-limiting example procedure to change VNF connectivity or PNF connectivity in accordance with some embodiments. It should be noted that the examples shown in FIGS. 8-10 may illustrate some or all of the concepts and techniques described herein in some cases, but embodiments are not limited by the examples. For instance, embodiments are not limited by the name, number, type, size, ordering, arrangement of elements (such as devices, operations, messages, packets, bearers and/or other elements) shown in FIGS. 8-10. Although some of the elements shown in the examples of FIGS. 8-10 may be included in a 3GPP LTE standard, 5G standard, NR standard and/or other standard, embodiments are not limited to usage of such elements that are included in standards.

In some embodiments, a system and/or method for dynamic change of connectivity among 5G VNF and PNF instances may be used. In some embodiments, a 5G network architecture may comprise one or more 5G core NFs (Network Functions) (including but not limited to UPF, SMF, NSSF, NEF, and/or other(s)), and NG RAN. In some embodiments, a functional split feature (including but not limited to a feature of 3GPP TR 38.801) may split a gNB 105 into a gNB-CU (Centralized Unit) 106 that implements the upper layer of gNB function and gNB-DU (Distributed Unit) 109 that implements the lower layer gNB function. In some embodiments, the 5G core networks functions and/or gNB-CU 106 may be implemented as VNFs (Virtualized Network Function). In some embodiments, gNB-DU 109 can be implemented as PNF (Physical Network Function).

In some embodiments, NFV may define the Network Service (NS) to encapsulate the VNFs and PNFs that are connected by virtual links to form a 5G network. In some embodiments, an NS may be created by one or more of the following. 1) The NS may be designed by creation of an NSD (Network Service Descriptor) that is the deployment template containing information necessary for NFV Orchestrator (NFVO) to create a NS. The NSD may include one or more of the following attributes (see clause 6.2.2 in ETSI GS NFV-IFA 014): a VNF Descriptor: a deployment template describes a VNF in terms of deployment and operational behaviour requirements; a PNF Descriptor: a deployment template enabling on-boarding PNFs with special focus on connectivity aspects among PNFs and VNFs; an NS virtual link descriptor: may include information related to the instantiation of NS virtual link instances; VNF profiles: may include information related to the instantiation of VNF instances, and the connection relationship between a VNF connection point and a NS virtual Link; PNF profiles: may include information related to the connection relationship between a PNF connection point and a NS virtual Link; and/or other(s). 2) The NSD may be uploaded at the NFVO. 3) An NS identifier may be created based on the NSD to associate the NSD with the NS that is identified by the NS instance ID. 4) The NS may be instantiated based on the NS instance ID created in #3 above. Once an NS has been instantiated, the NS run-time information may be included in the NsInfo information element (see clause 8.3.3.2 in ETSI GS NFV-IFA 013) that includes the information related to VNF instances, PNF instances, and virtual link instances.

In some embodiments, in ETSI NFV MANO (Management and Orchestration), NS run-time information may have to be aligned with the design time information in NSD. However, in 5G networks, there will be a huge number of VNFs (e.g., gNB CU 106 and 5GC nodes) and PNFs (e.g., gNB-DU 109). Therefore, the connectivity among VNF and PNF instances in one NS instance will need to be changed dynamically. According to the NFV MANO principle, it means that every connectivity change may require 1) NSD update, 2) association of NS instance with the updated NSD, which can result in huge overhead to the NFV LCM operation, and service interruption.

In addition, it was found that several actions (shown below) in the Update NS operation in ETSI GS NFV-IFA013 can result in the run-time and design time misalignment that violates the ETSI NFV MANO principle. 1) InstantiateVnf (instantiating new VNF(s)): It instantiates a new VNF instance with external virtual link instance indicated in ExtVirtualLinkData in clause 8.3.4.13 without associating with the VnfProfile in the NSD. 2) ChangeExtVnfConnectivity (changing the external connectivity of VNF instance(s)): It changes the external connectivity of a VNF instance to a virtual link instance indicated in ExtVirtualLinkData without associating with the VnfProfile in the NSD. 3) UpdateVnffg (updating VNFFG(s)): It adds a NFP to a VNFFG instance without associating with Vnffgd in the NSD. 4) ChangeVnfDf (Changing VNF DF): It changes VNF's deployment flavour and external virtual link indicated in ExtVirtualLinkData without associating with the VnfProfile in the NSD.

In some embodiments, one or more techniques may be used to enable the dynamic changes of connectivity among VNFs and PNFs while maintaining the NS run-time and design time alignment. In some embodiments, one or more of the following actions in the Update NS operation in ETSI GS NFV-IFA013 may enable 3GPP operators to change the connectivity of PNF and VNF to NS virtual links: associate a PNF with a new or updated PnfProfile; associate a VNF instance with a new or updated VnfProfile; associate a VNF/PNF instance with a new or updated VnfProfile or PnfProfile; and/or other. The PNF and VNF instances are connected, when their associated PNF profile or VNF profile contain the same NS virtual link, NsVirtualLinkConnectivity.

In some embodiments, an update NS operation may be performed. This operation updates an NS instance. This operation is also used to embed VNF LCM operations in support of fine grained NS LCM approach. Actions that can be performed with an update include, but are not limited to: adding existing VNF instances to the NS instance; removing VNF instances from the NS instance; instantiating new VNF instances and adding them to the NS instance; changing the DF of VNF instances belonging to the NS instance; changing the operational state of a VNF instance belonging to the NS instance; modifying information data and/or the configurable properties of a VNF instance belonging to the NS instance; changing the external connectivity of a VNF instance belonging to the NS instance; adding SAPs to the NS instance; removing SAPs from the NS instance; adding existing NS instances to the NS instance; removing nested NS instances from the NS instance; associating a new NSD version to the NS instance; moving VNF instances from one NS instance to another NS instance; adding VNFFGs to the NS instance; removing VNFFGs from the NS instance; updating VNFFGs of the NS instance; changing the DF of the NS instance; adding PNFs to the NS instance; modifying PNFs in the NS instance; removing PNFs from the NS instance; associating a PNF with a new or updated PnfProfile; associating a VNF instance with a new or updated VnfProfile; and/or other. In some embodiments, the actions that can be performed with the update may further include associating a VNF/PNF instance with a new or updated VnfProfile or PnfProfile.

In some embodiments, only one type of update shall be allowed per operation, although the scope of embodiments is not limited in this respect. The table below (which may be the same as or similar to Table 7.3.5.1-1 of ETSI GS NFV-IFA 013, although the scope of embodiments is not limited in this respect) lists the information flow exchanged between the OSS/BSS and the NFVO. It is possible, however, to request several updates of a given type in one Update NS operation (as indicated in the cardinalities in table 7.3.5.2-1 of ETSI GS NFV-IFA 013).

| Message | Requirement | Direction |
| --- | --- | --- |
| UpdateNsRequest | Mandatory | OSS/BSS NFVO |
| UpdateNsResponse | Mandatory | NFVO OSS/BSS |

In some embodiments, input parameters sent when invoking the update NS operation shall follow the indications provided in the table below (which may be the same as or similar to table 7.3.5.2-1 of ETSI GS NFV-IFA 013, although the scope of embodiments is not limited in this respect).

| Parameter | Qualifier | Cardinality | Content | Description |
| --- | --- | --- | --- | --- |
| nsInstanceId | M | 1 | Identifier | Identifier of the NS instance being updated. |
| updateType | M | 1 | Enum | Specifies the type of update. This parameter determines also which one of the following parameter is present in the operation. Possible values are: AddVnf (adding existing VNF instance(s)), RemoveVnf (removing VNF instance(s)), InstantiateVnf (instantiating new VNF(s)), ChangeVnfDf (Changing VNF DF), OperateVnf (changing VNF state), ModifyVnfInformation (modifying VNF information and/or the configurable properties of VNF instance(s)), ChangeExtVnfConnectivity (changing the external connectivity of VNF instance(s)), AddSap (adding SAP(s)), RemoveSap (removing SAP(s)), AddNestedNs (adding existing NS instance(s) as nested NS(s)), RemoveNestedNs (removing existing nested NS instance(s)), AssocNewNsdVersion (associating a new NSD version to the NS instance), MoveVnf (moving VNF instance(s) from one origin NS instance to a another target NS instance), AddVnffg (adding VNFFG(s)), RemoveVnffg (removing VNFFG(s)), UpdateVnffg (updating VNFFG(s)), ChangeNsDf (changing NS DF), AddPnf (adding PNF), ModifyPnf(modify PNF), RemovePnf (removing PNF). CreateSnapshot (creating VNF Snapshot). See note 3. RevertToSnapshot (reverting to VNF Snapshot). See notes 3 and 4. DeleteSnapshotInfo (deleting available VNF Snapshot information). See note 3. AssocPnfWithPnfProfile (associating a PNF with a new or updated PnfProfile), AssocVnfWithVnfProfile (associating a VNF instance with a new or updated VnfProfile), |
| addVnfInstance | M | 0...N | VnfInstance Data | Specify an existing VNF instance to be added to the NS instance. This parameter shall be present only if updateType = AddVnf. |

-continued

| Parameter | Qualifier | Cardinality | Content | Description |
|---|---|---|---|---|
| removeVnfInstanceId | M | 0 . . . N | Identifier | Specify an existing VNF instance to be removed from the NS instance. The parameter contains the identifier(s) of the VNF instances to be removed. This parameter shall be present only if updateType = RemoveVnf. See note 1. |
| instantiateVnfData | M | 0 . . . N | InstantiateVnfData | Specify the new VNF to be instantiated. This parameter can be used e.g. for the bottom-up NS creation. This parameter shall be present only if updateType = InstantiateVnf. |
| changeVnfFlavourData | M | 0 . . . N | ChangeVnfFlavourData | Specify the new DF of the VNF instance to be changed to. This parameter shall be present only if updateType = ChangeVnfDf. |
| operateVnfData | M | 0 . . . N | OperateVnfData | Specify the state of the VNF instance to be changed. This parameter shall be present only if updateType = OperateVnf. |
| modifyVnfInfoData | M | 0 . . . N | ModifyVnfInfoData | Specify the VNF Information parameters and/or the configurable properties of VNF instance to be modified. This parameter shall be present only if updateType = ModifyVnfInformation. |
| changeExtVnfConnectivityData | M | 0 . . . N | ChangeExtVnfConnectivityData | Specify the new external connectivity data of the VNF instance to be changed. This parameter shall be present only if updateType = ChangeExtVnfConnectivity. |
| addSap | M | 0 . . . N | SapData | Specify a new SAP to be added to the NS instance. This parameter shall be present only if updateType = AddSap. |
| removeSapId | M | 0 . . . N | Identifier | Specify an existing SAP to be removed from the NS instance. The parameter shall be present only if updateType = RemoveSap. |
| addNestedNsData | M | 0 . . . N | NestedNsInstanceData | Specify an existing nested NS instance to be added to (nested within) the NS instance. This parameter shall be present only if updateType = AddNestedNs. |
| removeNestedNsId | M | 0 . . . N | Identifier | Specify an existing nested NS instance to be removed from the NS instance. The parameter shall be present only if updateType = RemoveVnfNestedNs. |
| assocNewNsdVersionData | M | 0 . . . 1 | AssocNewNsdVersionData | Specify the new NSD to be used for the NS instance. This parameter shall be present only if updateType = AssocNewNsdVersion. |
| moveVnfInstanceData | M | 0 . . . N | MoveVnfInstanceData | Specify existing VNF instance to be moved from one NS instance to another NS instance. This parameter shall be present only if updateType = MoveVnf. |
| addVnffg | M | 0 . . . N | AddVnffgData | Specify the new VNFFG to be created to the NS Instance. This parameter shall be present only if updateType = AddVnffg. |
| removeVnffgId | M | 0 . . . N | Identifier | Identifier of an existing VNFFG to be removed from the NS Instance. This parameter shall be present only if updateType = RemoveVnffg. |
| updateVnffg | M | 0 . . . N | UpdateVnffgData | Specify the new VNFFG Information data to be updated for a VNFFG of the NS Instance. This parameter shall be present only if updateType = UpdateVnffg. |
| changeNsFlavourData | M | 0 . . . 1 | ChangeNsFlavourData | Specifies the new DF to be applied to the NS instance. It shall be present only if updateType = ChangeNsDf. |
| updateTime | M | 0 . . . 1 | DateTime | Timestamp indicating the update time of the NS, i.e. the NS will be updated at this timestamp. Cardinality "0" indicates the NS update takes place immediately. |
| addPnfData | M | 0 . . . N | AddPnfData | Information of the PNF(s) that are being added into the NS instance. This parameter shall be present only if updateType = AddPnf. |
| modifyPnfData | M | 0 . . . N | ModifyPnfData | Information on the PNF(s) that are being modified in this NS instance. This parameter shall be present only if updateType = ModifyPnf. See note 2. |
| removePnfId | M | 0 . . . N | Identifier | Identifier of the PNF(s) that are part of this NS instance and that should be deleted from it. This parameter shall be present only if updateType = RemovePnf. |

-continued

| Parameter | Qualifier | Cardinality | Content | Description |
|---|---|---|---|---|
| createSnapshotVnfInstanceId | M | 0...1 | Identifier | Specify the VNF instance to be snapshotted. This parameter shall be present only if updateType = CreateSnapshot. |
| revertToSnapshotData | M | 0...1 | RevertTo Snapshot Data | Specify the VNF instance to be reverted and the VNF Snapshot to be reverted to. This parameter shall be present only if updateType = RevertToSnapshot. |
| deleteSnapshotData | M | 0...1 | DeleteSnapshot Data | Specify the VNF Snapshot info to be deleted and the related VNF instance. This parameter shall be present only if updateType = DeleteSnapshotInfo. |
| associatePnfWithPnfProfile | M | 0...N | PnfProfile Data | Specify the data needed for associating PNF with the new or updated PnfProfile. This parameter shall be present only if updateType = AssocPnfWithPnfProfile. See note 5. |
| associateVnfWithPnfProfile | M | 0...N | VnfProfile Data | Specify the data needed for associating VNF instance with the new or updated VnfProfile. This parameter shall be present only if updateType = AssocVnfWithVnfProfile. See note 6. | note 1:
If a VNF instance is removed from an NS and this NS was the last one for which this VNF instance was a part, the VNF instance is terminated by the NFVO.
note 2:
New CP addresses should be contained in the element, if PNF CPs need to be changed.
note 3:
It depends on the VNF capabilities, and is declared in the VNFD (refer to the "supportedOperations" attribute in the VnfDf information element; see clause 7.1.8.2 in ETSI GS NFV-IFA 011 [2]), whether the operation is supported for a particular VNF.
note 4:
The operation may be service-disruptive.
note 5:
A new version of NSD with the new or updated PnfProfile needs to be uploaded, and associated with the NS prior to invoking the NS update operation.
note 6:
A new version of NSD with the new or updated VnfProfile needs to be uploaded, and associated with the NS prior to invoking the NS update operation.

In some embodiments, a PnfProfileData information element (IE) may be used. In some embodiments, the PnfProfileData information element specifies the information needed to associate a PNF with the PnfProfile. The types of association may include: associate the PNF with a new PnfProfile that has been added to the NSD. If the PNF is currently associated with an existing PnfProfile, it should dissociate with such PnfProfile prior to association with the new PnfProfile; associate the PNF with the PnfProfile that has been updated; and/or other. In some embodiments, the type of changes permitted in the PnfProfile which allow the re-association of the PNF to the new PnfProfile are: to support the changes of connectivity of the PNF. The association may result in adding or changing connectivity for the PNF instance.

The attributes of the PnfProfileData information element may follow the indications provided in the table below (which may be the same as or similar to table 8.3.4.41.2-1 of ETSI GS NFV-IFA 013, although the scope of embodiments is not limited in this respect).

In some embodiments, a VnfProfileData information element may be used. The VnfProfileData information element specifies the information needed to associate a VNF instance with the VnfProfile. The types of association may include: associate the VNF instance with a new VnfProfile that has been added to the NSD. If the VNF instance is currently associated with an existing VnfProfile, it should dissociate with such VnfProfile prior to association with the new VnfProfile; associate the VNF instance with the VnfProfile that has been updated; and/or other. In some embodiments, the type of changes permitted in the VnfProfile which allow the re-association of the VNF to the new VnfProfile are: to support the changes of connectivity of the VNF, i.e., changes in the nsVirtualLinkConnectivity (refer to ETSI GS NFV-IFA 014, clause 6.3.3).

In some embodiments, the attributes of the VnfProfileData information element shall follow the indications provided in the table below (be the same as or similar to table 8.3.4.42.2-1 of ETSI GS NFV-IFA 013, although the scope of embodiments is not limited in this respect).

| Attribute | Qualifier | Cardinality | Content | Description |
|---|---|---|---|---|
| pnfId | M | 1 | Identifier | Identifier of the PNF. |
| pnfProfileId | M | 1 | Identifier (Reference to PnfProfile) | Identifier of (Reference to) a PnfProfile. The PnfProfile can be an update of the existing PNF profile or a new PNF profile, which the PNF shall be associated with. See note. | note:
The PnfProfile may contain the new or changed NsVirtualLinkConnectivity for the PNF.

| Attribute | Qualifier | Cardinality | Content | Description |
| --- | --- | --- | --- | --- |
| vnfInstanceId | M | 1 | Identifier | Identifier of the VNF instance. |
| vnfProfileId | M | 1 | Identifier (Reference to VnfProfile) | Identifier of (Reference to) a VnfProfile. The VnfProfile can be an update of the existing VNF profile or a new VNF profile, which the VNF instance shall be associated with. See note. | note:
The VnfProfile may contain the new or changed NsVirtualLinkConnectivity for the VNF.

FIG. 8 shows a non-limiting example procedure 800, which illustrates how VNF connectivity to NS virtual link can be changed by adding a new VnfProfile with connectivity information. Embodiments are not limited to the operations shown in FIG. 8. Embodiments are not limited to the name, type, ordering or other aspects of the operations shown in FIG. 8. Embodiments are not limited to the name, type, ordering or other aspects of parameters/values shown in FIG. 8. Some embodiments may not necessarily include all operations shown in FIG. 8. Some embodiments may include one or more operations not shown in FIG. 8. Some embodiments may include one or more operations that may be the same as, similar to, reciprocal to one or more operations shown in FIG. 8. In some embodiments, one or more parameters/values may be similar to and/or different from one or more of the parameters/values shown in FIG. 8.

In Operation #1 of 800, the NM 160 may add a new VnfProfile (see clause 6.3.3.2 in ETSI GS NFV-IFA14) to the NSD with the information of NS virtual link to which the VNF is connected. In Operation #1 of 800, the NM 160 may send the NFVO 180 an UploadNsdRequest to upload the new version of NSD. In Operation #3 of 800, the NFVO 180 may send the NM 160 an UploadNsdResponse to indicate the NSD upload has been initiated. In Operation #4 of 800, the NFVO 180 may send the NM 160 a Notify (see clause 7.2.13 in ETSI GS NFV-IFA13) carrying an NsOnBoardingNotification information element with attributes nsdInfoId and nsdId (see clause 8.2.6) to indicate the new version of NSD has been on-board. In Operation #5 of 800, the NM 160 may send to the NFVO 180 anUpdateNsRequest with parameters nsInstanceId, updateType="AssociateNewNsdVersion", assocNewNsdVersionData, and updateTime to associate a new NSD version to the NS instance (see clause 7.3.5.2 in ETSI GS NFV-IFA13). The assocNewNsdVersionData contains the parameter newNsdId, and sync=false to indicate the NS instance should not be automatically synchronized to the new NSD. In Operation #6 of 800, the NFVO 180 may send the NM 160 an UpdateNsResponse with parameter lifecycleOperationOccurrenceId providing the identifier of the NS lifecycle operation occurrence (see clause 7.3.5.3 in ETSI GS NFV-IFA13). In Operation #7 of 800, the NFVO 180 may send to the NM 160 a Notify (see clause 7.4.3 in ETSI GS NFV-IFA13) carrying an NsLifecycleChangeNotification information element with attributes nsInstanceId, lifecycleOperationOccurrenceId, operation="UpdateNs", and notificationType="start" to indicate the start of the NS update (see clause 8.3.2.2 in ETSI GS NFV-IFA13). In Operation #8 of 800, the NFVO 180 may send the NM 160 a Notify (see clause 7.4.3) carrying an NsLifecycleChangeNotification information element with attributes nsInstanceId, lifecycleOperationOccurrenceId, operation="UpdateNs", notificationType="result" to indicate the end result of NS update. In Operation #9 of 800, the NM 160 may send the NFVO 180 an UpdateNsRequest (see clause 7.3.5 in ETSI GS NFV-IFA13) with parameters nsInstanceId, updateType="AssocVnfWithVnfProfile", vnfInstanceId and vnfProfileId to associate the VNF instance with the vnfProfileId. In Operation #10 of 800, the NFVO 180 may send the NM 160 an UpdateNsResponse (see clause 7.3.5 in ETSI GS NFV-IFA13) with the attribute nsInstanceId identifier of the lifecycleOperationOccurrenceId that is the identifier of the NS lifecycle operation occurrence. In Operation #11 of 800, the NFVO 180 may send the NM 160 a Notify (see clause 7.4.3 in ETSI GS NFV-IFA13) carrying an NsLifecycleChangeNotification information element with attributes nsInstanceId, lifecycleOperationOccurrenceId, operation="NsUpdate", and notificationType="start" to indicate the start of the NS update. In Operation #12 of 800, the NFVO 180 may send the NM 160 a Notify (see clause 7.4.3 in ETSI GS NFV-IFA13) carrying an NsLifecycleChangeNotification information element with attributes nsInstanceId, lifecycleOperationOccurrenceId, operation="NsUpdate", and notificationType="result" to indicate the end result of the NS update.

FIG. 9 shows a non-limiting example procedure 900 of how PNF connectivity to NS virtual link can be changed by adding a new PnfProfile with connectivity information. Embodiments are not limited to the operations shown in FIG. 9. Embodiments are not limited to the name, type, ordering or other aspects of the operations shown in FIG. 9. Embodiments are not limited to the name, type, ordering or other aspects of parameters/values shown in FIG. 9. Some embodiments may not necessarily include all operations shown in FIG. 9. Some embodiments may include one or more operations not shown in FIG. 9. Some embodiments may include one or more operations that may be the same as, similar to, reciprocal to one or more operations shown in FIG. 9. In some embodiments, one or more parameters/values may be similar to and/or different from one or more of the parameters/values shown in FIG. 9.

In operation #1 of 900, the NM 160 changes the PnfProfile (see clause 6.3.3.2 in ETSI GS NFV-IFA14) in the NSD with the information of NS virtual link to which the PNF is connected. In operation #2 of 900, the NM 160 may send the NFVO 180 an UploadNsdRequest to upload the new version of NSD. In operation #3 of 900, the NFVO 180 may send the NM 160 an UploadNsdResponse to indicate the NSD upload has been initiated. In operation #4 of 900, the NFVO 180 may send the NM 160 a Notify (see clause 7.2.13 in ETSI GS NFV-IFA13) carrying an NsOnBoardingNotification information element with attributes nsdInfoId and nsdId (see clause 8.2.6) to indicate the new version of NSD has been on-board. In operation #5 of 900, the NM 160 may send the NFVO 180 an UpdateNsRequest with parameters nsInstanceId, updateType="AssociateNewNsdVersion", assocNewNsdVersionData, and updateTime to associate a new NSD version to the NS instance (see clause 7.3.5.2 in ETSI GS NFV-IFA13). The assocNewNsdVersionData contains the parameter newNsdId, and sync=false to indicate the NS instance should not be automatically synchronized to the new NSD. In operation #6 of 900, the NFVO 180 may send the NM 160 an UpdateNsResponse with parameter lifecycleOperationOccurrenceId providing the identifier of the NS lifecycle operation occurrence (see clause 7.3.5.3 in ETSI GS NFV-IFA13). In operation #7 of 900, the NFVO 180 may send the NM 160 a Notify (see clause 7.4.3 in ETSI GS NFV-IFA13) carrying an NsLifecycleChangeNotification information element with attributes nsInstanceId, lifecycleOperationOccurrenceId, operation="UpdateNs", and notificationType="start" to indicate the start of the NS update (see clause 8.3.2.2 in ETSI GS NFV-IFA13). In operation #8 of 900, the NFVO 180 may send the NM 160 a Notify (see clause 7.4.3) carrying an NsLifecycleChangeNotification information element with attributes nsInstanceId, lifecycleOperationOccurrenceId, operation="UpdateNs", notificationType="result" to indicate the end result of NS update. In operation #9 of 900, the NM 160 may send the NFVO 180 an UpdateNsRequest (see clause 7.3.5 in ETSI GS NFV-IFA13) with parameters nsInstanceId, updateType="AssocPnfWithPnfProfile", pnfId and pnfProfileId to associate the PNF with the pnfProfileId. In operation #10 of 900, the NFVO 180 may send the NM 160 an UpdateNsResponse (see clause 7.3.5 in ETSI GS NFV-IFA13) with the attribute nsInstanceId identifier of the lifecycleOperationOccurrenceId that is the identifier of the NS lifecycle operation occurrence. In operation #11 of 900, the NFVO 180 may send the NM 160 a Notify (see clause 7.4.3 in ETSI GS NFV-IFA13) carrying an NsLifecycleChangeNotification information element with attributes nsInstanceId, lifecycleOperationOccurrenceId, operation="NsUpdate", and notificationType="start" to indicate the start of the NS update. In operation #12 of 900, the NFVO 180 may send the NM 160 a Notify (see clause 7.4.3 in ETSI GS NFV-IFA13) carrying an NsLifecycleChangeNotification information element with attributes nsInstanceId, lifecycleOperationOccurrenceId, operation="NsUpdate", and notificationType="result" to indicate the end result of the NS update.

FIG. 10 shows a non-limiting example procedure 1000, which illustrates how PNF/VNF connectivity to NS virtual link can be changed by adding a new PnfProfile/VnfProfile with connectivity information. Embodiments are not limited to the operations shown in FIG. 10. Embodiments are not limited to the name, type, ordering or other aspects of the operations shown in FIG. 10. Embodiments are not limited to the name, type, ordering or other aspects of parameters/values shown in FIG. 10. Some embodiments may not necessarily include all operations shown in FIG. 10. Some embodiments may include one or more operations not shown in FIG. 10. Some embodiments may include one or more operations that may be the same as, similar to, reciprocal to one or more operations shown in FIG. 10. In some embodiments, one or more parameters/values may be similar to and/or different from one or more of the parameters/values shown in FIG. 10.

One or more of the operations shown in FIG. 10 may be the same as or similar to one or more operations of FIG. 8 and/or FIG. 9, although the scope of embodiments is not limited in this respect. In some embodiments, in operation #9 of 1000, the NM 160 may send the NFVO 180 an UpdateNsRequest (see clause 7.3.5 in ETSI GS NFV-IFA13) with parameters nsInstanceId, updateType="AssocWithVnfOrPnfProfile", instanceId and ProfileId to associate the PNF or VNF instance identified by the instanceId with the pnfProfileId or vnfProfileId identified by the profileId.

In some embodiments, the NM 160 may, after making changes in the NSD, the NM 160 may perform one or more of: send an upload NSD request to NFVO 180 to upload a new version of NSD; receive a upload NSD response from NFVO 180 to indicate the NSD upload has been initiated; receive a NSD onboarding notification from NFVO 180 to indicate the new NSD has been on-boarded; send an NS update request to NFVO 180 to associate a new NSD with the NS instance; receive from NFVO 180 the NS update response containing the lifecycle operation occurrence identifier; receive from NFVO 180 the NS lifecycle change notification indicating the start of NS update; receive from NFVO 180 the NS Lifecycle Change notification to indicating the result of NS update; and/or other. In some embodiments, the changes that the NM 160 makes in the NSD are to change the connectivity among VNF and PNF instances in a NS instance, and may include one or more of:—adding a VNF profile to the NSD; changing the VNF profile in the NSD; adding a PNF profile to the NSD; changing the VNF profile in the NSD; and/or other. In some embodiments, the VNF profile or PNF profile may include information needed to connect the VNF or PNF instance to a NS virtual link, respectively. In some embodiments, when 2 instances are connected, such as VNF instance to VNF instance, PNF instance to PNF instance, or VNF instance to PNF instance, when the 2 instances are connected to the same NS virtual link.

In some embodiments, the NFVO 180 may perform one or more of: receive a upload NSD request from NM 160 to upload a new version of NSD; send an upload NSD response to NM 160 to indicate the NSD upload has been initiated; send an NSD onboarding notification to NM 160 to indicate the new NSD has been on-boarded; receive a NS update request from NM 160 to associate a new NSD with the NS instance; send to NM 160 the NS update response containing the lifecycle operation occurrence identifier; send to NM 160 the NS lifecycle change notification indicating the start of NS update; send to NM 160 the NS Lifecycle Change notification to indicating the result of NS update; and/or other. In some embodiments, for the NSD change to result in the connectivity change, the NM may perform one or more of: send a NS update request to NFVO to align the VNF or PNF instance in a NS instance with the profile in the NSD; receive from NFVO 180 the NS update response containing the lifecycle operation occurrence identifier; receive from NFVO 180 the NS lifecycle change notification indicating the start of NS update; receive from NFVO 180 the NS Lifecycle Change notification indicating the result of NS update. In some embodiments, the NS update request can be for one or more of: associate a PNF instance with a new or updated PnfProfile; associate a VNF instance with a new or updated VnfProfile; associate an instance (i.e. VNF or PNF instance) with a new or updated profile (i.e. VnfProfile or PnfProfile); and/or other. In some embodiments, the NFVO 180 may perform one or more of: receive a NS update request from NM 160 to align the VNF or PNF instance in a NS instance with the profile in the NSD; send to NM 160 the NS update response containing the lifecycle operation occurrence identifier; send to NM 160 the NS lifecycle change notification indicating the start of NS update; send to NM 160 the NS Lifecycle Change notification indicating the result of NS update; and/or other.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, the apparatus comprising:
   at least one processor configured to operate as a network manager (NM), wherein when configured to operate as an NM, the at least one processor is configured to:
   exchange signaling with a Network Function Virtualization Orchestrator (NFVO) to add or change connectivity of a virtual network function (VNF) or a physical network function (PNF) by associating the VNF or PNF with a new or updated VNF Profile or PNF profile, respectively, with network service (NS) virtual link information, wherein said exchanging signaling includes:
      sending to the NINO a first update NS request message to associate a new network service descriptor (NSD) that indicates the new or updated VNF Profile or PNF profile to update an NS instance, wherein the new NSD has been uploaded to the NFVO;
      sending to the NFVO a second update NS request message to associate the VNF or PNF with the new or updated VNF Profile or PNF profile, respectively, wherein the second update NS request message includes:
         an nsInstanceID parameter that identifies the NS instance, and
         an updateType parameter that indicates a type of update for the NS instance, wherein:
            when the updateType parameter value is "AssocPnfWithPnfProfile", the updateType parameter value indicates a request to associate the PNF of the NS instance with the new or updated PNF profile indicated by the new NSD, and
            when the updateType parameter value is "AssocVnfWithVnfProfile", the updateType parameter value indicates a request to associate the VNF of the NS instance with the new or updated VNF profile indicated by the new NSD.

2. The apparatus according to claim 1, wherein:
   if the updateType parameter is encoded to the value of "AssocPnfWithPnfProfile," when configured to operate as an NM, the at least one processor is configured to encode the second update NS request message to include a PnfProfileData information element (IE) that includes:
      a pnfId parameter that identifies the PNF of the NS instance to be updated, and
      a pnfProfileId parameter that identifies the new or updated PNF profile to which the PNF of the NS instance is to be associated.

3. The apparatus according to claim 2, wherein:
   if the updateType parameter is encoded to the value of "AssocVnfVithVnfProfile," when configured to operate as an NM, the at least one processor is configured to encode the second update NS request message to include a VnfProfileData information element (IE) that includes:
      a vnfInstanceId parameter that identifies the VNF of the NS instance to be updated, and
      a vnfProfileId parameter that identifies the new or updated VNF profile to which the VNF of the NS instance is to be associated.

4. The apparatus according to claim 1, wherein when configured to operate as an NM, the at least one processor is configured to:
   decode, from the NFVO in response to the second update NS request message, an update NS response message that includes a lifecycleOperationOccurrenceId parameter that indicates an occurrence of an NS operation.

5. The apparatus according to claim 4, wherein when configured to operate as an NM, the at least one processor is configured to:
   decode, from the NEW in response to the second update NS request message, a first Notify message that includes an NsLifecycleChangeNotification information element (IE) that includes:
      the nsInstanceID parameter,
      the lifecycleOperationOccurrenceId parameter,
      an operation parameter set to a value of "NsUpdate," and
      a notification Type parameter set to a value of "start" to indicate a start of the NS update; and
   decode, from the NFVO in response to the second update NS request message, a second Notify message that includes an NsLifecycleChangeNotification IE that includes:
      the nsInstanceID parameter,
      the lifecycleOperationOccurrenceId parameter,
      the operation parameter set to a value of "NsUpdate," and
      the notification Type parameter set to a value of "result" to indicate an end result of the NS update.

6. The apparatus according to claim 1, wherein when configured to operate as an NM, the at least one processor is configured to:
   determine, based on signaling from the NFVO, that the new NSD has been uploaded by the NFVO and that the new NSD has been associated with the NS instance;
   restrict transfer of the second update NS request message until after it has been determined that the new NSD has been uploaded by the NFVO and that the new NSD has been associated with the NS instance.

7. The apparatus according to claim 1, wherein when configured to operate as an NM, the at least one processor is configured to perform management functions for a New Radio (NR) network, including functions related to VNFs.

8. The apparatus of claim 1, wherein the NM is part of an Operations Support System/Business Support System (OSS/BSS) of a New Radio (NR) network.

9. The apparatus according to claim 8, wherein when configured to operate as an NM, the at least one processor is configured to:
   exchange signaling with an Element Manager (EM) of the NR network to configure a Next Generation Node-B (gNB), the gNB comprising a gNB Central Unit (gNB-CU) and a gNB Distributed Unit (gNB-DU),
   wherein the signaling configures the VNF for the gNB-CU,
   wherein the signaling configures the PNF for the gNB-DU.

10. The apparatus according to claim 1, wherein the NM is configured to communicate with the NFVO to initiate lifecycle management procedures for cloud-based implementations of VNFs.

11. The apparatus according to claim 1, wherein the NM is configured to communicate with the NFVO to enable dynamic adaptation of NSDs, NFs and/or PNFs.

12. The apparatus according to claim 1, wherein:
the at least one processor includes a baseband processor to encode the second update NS request message, and when configured to operate as an NM, the at least one processor is configured to transfer the second update NS request message to the NFVO on an Os-MA-nfvo interface.

13. A non-transitory, computer accessible memory medium storing program instructions executable by at least one processor to cause a network manager (NM) to:
exchange signaling with a Network Function Virtualization Orchestrator (NFVO) to add or change connectivity of a virtual network function (VNF) or a physical network function (PNF) by associating the VNF or PNF with a new or updated VNF Profile or PNF profile, respectively, with network service (NS) virtual link information, wherein said exchanging signaling includes:
sending to the NFVO a first update NS request message to associate a new network service descriptor (NSD) that indicates the new or updated VNF Profile or PNF profile to update an NS instance, wherein the new NSD has been uploaded to the NFVO;
sending to the NFVO a second update NS request message to associate the VNF or PNF with the new or updated VNF Profile or PNF profile, respectively, wherein the second update NS request message includes:
an nsInstanceID parameter that identifies the NS instance, and
an updateType parameter that indicates a type of update for the NS instance, wherein:
when the updateType parameter value is "AssocPnfWithPnfProfile", the updateType parameter value indicates a request to associate the PNF of the NS instance with the new or updated PNF profile indicated by the new NSD, and
when the updateType parameter value is "AssocVnfWithVnfProfile", the updateType parameter value indicates a request to associate the VNF of the NS instance with the new or updated VNF profile indicated by the new NSD.

14. The non-transitory, computer accessible memory medium according to claim 13, wherein:
if the updateType parameter is encoded to the value of "AssocPnfWithPnfProfile", the program instructions are further executable to encode the second update NS request message to include a PnfProfileData information element (IE) that includes:
a pnfId parameter that identities the PNF of the NS instance to be updated, and
a pnfProfileId parameter that identifies the new or updated PNF profile to which the PNF of the NS instance is to be associated.

15. The non-transitory, computer accessible memory medium according to claim 13, wherein:
if the updateType parameter is encoded to the value of "AssocVnfWithVnfProfile", the program instructions are further executable to encode the second update NS request message to include a VnfProfileData information element (IE) that includes:
a vnfInstanceId parameter that identities the VNF of the NS instance to be updated, and
a vnfProfileId parameter that identifies the new or updated VNF profile to which the VNF of the NS instance is to be associated.

16. The non-transitory, computer accessible memory medium according to claim 13, the program instructions are further executable to:
decode, from the NFVO in response to the second update NS request message, an update NS response message that includes a lifecycleOperationOccurrenceId parameter that indicates an occurrence of an NS lifecycle operation.

17. A method for operating a network function virtualization orchestrator (NFVO) comprising:
by the NFVO:
exchanging signaling with a network manager (NM) to add or change connectivity of a virtual network function (VNF) or a physical network function (PNF) by associating the VNF or PNF with a new or updated VNF Profile or PNF profile, respectively, with network service (NS) virtual link information, wherein said exchanging signaling includes:
receiving from the NM a first update NS request message to associate a new network service descriptor (NSD) that indicates the new or updated VNF Profile or PNF profile to update an NS instance, wherein the new NSD has been uploaded to the NFVO;
receiving from the NM a second update NS request message to associate the VNF or PNF with the new or updated VNF Profile or PNF profile, respectively, wherein the second update NS request message includes:
an nsInstanceID parameter that identifies the NS instance, and
an updateType parameter that indicates a type of update for the NS instance, wherein:
when the updateType parameter value is "AssocPnfWithPnfProfile", the updateType parameter value indicates a request to associate the PNF of the NS instance with the new or updated PNF profile indicated by the new NSD, and
when the updateType parameter value is "AssocVnfWithVnfProfile", the updateType parameter value indicates a request to associate the VNF of the NS instance with the new or updated VNF profile indicated by the new NSD.

18. The method according to claim 17, Wherein:
if the updateType parameter is encoded to the value of "AssocPnfWithPnfProfile", the second update NS request message is encoded to include a PnfProfileData information element (IE) that includes:
a pnfId parameter that identifies the PNF of the NS instance to be updated, and
a pnfProfileId parameter that identifies the new or updated PNF profile to which the PNF of the NS instance is to be associated.

19. The method according to claim 17, wherein:
if the updateType parameter is encoded to the value of "AssocVnfWithVnfProfile", the second update NS request message includes a VnfProfileData information element (IE) that includes:
a vnfInstanceId parameter that identifies the VINE of the NS instance to be updated, and
a vnfProfileId parameter that identifies the new or updated VNF profile to which the VNF of the NS instance is to be associated.

20. The method according to claim 17, further comprising:

transmitting, to the NM, in response to the second update NS request message, an update NS response message that includes a lifecycleOperationOccurrenceId parameter that indicates an occurrence of an NS lifecycle operation.

\* \* \* \* \*

UNITED STATES PATENT AND TRADEMARK OFFICE
CERTIFICATE OF CORRECTION

PATENT NO. : 11,303,501 B2
APPLICATION NO. : 16/509959
DATED : April 12, 2022
INVENTOR(S) : Joey Chou et al.

It is certified that error appears in the above-identified patent and that said Letters Patent is hereby corrected as shown below:

In the Claims

Column 31, Line 24, Claim 1, delete "NINO" and insert --NFVO--

Column 31, Line 63, Claim 3, delete "AssocVnfVithVnfProfile" and insert --AssocVnfWithVnfProfile--

Column 32, Line 12, Claim 4, delete "NS operation" and insert --NS lifecycle operation--

Column 32, Line 16, Claim 5, delete "NEW" and insert --NFVO--

Column 33, Line 3, Claim 11, delete "NFs" and insert --VNFs--

Column 33, Line 54, Claim 14, delete "identities" and insert --identifies--

Column 33, Line 64, Claim 15, delete "identities" and insert --identifies--

Column 34, Line 13, Claim 17, delete "(NFVO)" and insert --(NFVO),--

Column 34, Line 48, Claim 18, delete "Wherein" and insert --wherein--

Column 34, Line 63, Claim 19, delete "VINE" and insert --VNF--

Signed and Sealed this
Thirtieth Day of May, 2023

Katherine Kelly Vidal
*Director of the United States Patent and Trademark Office*